(12) United States Patent
Morimoto

(10) Patent No.: US 11,221,812 B2
(45) Date of Patent: Jan. 11, 2022

(54) PRINTING METHOD, PRINTING SYSTEM, PRINTING APPARATUS, AND PROGRAM

(71) Applicant: SEIKO EPSON CORPORATION, Tokyo (JP)

(72) Inventor: Nobuo Morimoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/086,833

(22) Filed: Nov. 2, 2020

(65) Prior Publication Data

US 2021/0132881 A1   May 6, 2021

(51) Int. Cl.
*G06F 3/12*   (2006.01)

(52) U.S. Cl.
CPC .......... *G06F 3/1243* (2013.01); *G06F 3/1206* (2013.01); *G06F 3/1268* (2013.01)

(58) Field of Classification Search
CPC .... G06F 3/1243; G06F 3/1268; G06F 3/1206; G06F 3/1244; G06F 2206/1514; H04N 1/3876; H04N 1/32525; H04N 1/32523
See application file for complete search history.

(56) References Cited

U.S. PATENT DOCUMENTS

| 2008/0141885 A1* | 6/2008 | Hu ..................... B42D 15/0073 101/483 |
| 2013/0128303 A1* | 5/2013 | Rai ....................... G06F 3/1285 358/1.15 |

FOREIGN PATENT DOCUMENTS

| JP | H09-193500 A | 7/1997 |
| JP | 2016-119534 A | 6/2016 |

\* cited by examiner

*Primary Examiner* — King Y Poon
*Assistant Examiner* — Michael Burleson
(74) *Attorney, Agent, or Firm* — Workman Nydegger

(57) ABSTRACT

A printing method for performing poster printing in a printing system comprising a plurality of printing apparatuses, the printing method includes dividing original image data to be printed into a plurality of divided image data, assigning each of the divided image data to two or more printing apparatuses among the plurality of the printing apparatuses, acquiring print dimension accuracy information of each of the printing apparatuses assigned with the divided image data, performing dimension correction on a part or all of the divided image data corresponding to the printing apparatus assigned with each of the divided image data based on the acquired print dimension accuracy information, and performing printing by the printing apparatus assigned with the divided image data based on the divided image data that underwent the correcting step.

15 Claims, 14 Drawing Sheets

PRINTING METHOD, PRINTING SYSTEM, PRINTING APPARATUS, AND PROGRAM

The present application is based on, and claims priority from JP Application Serial Number 2019-198381, filed Oct. 31, 2019, the disclosure of which is hereby incorporated by reference herein in its entirety.

BACKGROUND

1. Technical Field

The present disclosure relates to a printing method of poster printing performed using a plurality of printing apparatuses, a printing system for realizing the printing method, a printing apparatus constituting the printing system, and a program for realizing the printing method.

2. Related Art

JP-A-9-193500 describes a disclosure for so-called poster printing in which an oversized poster is divided into a plurality of parts and printed by one printer, and a plurality of printed matters thus printed are joined to complete the oversized poster.

However, when such poster printing is the poster printing is performed in a distributed manner in a plurality of printers in order to shorten the printing time, there is a problem in that, due to individual differences in the plurality of printers, for example, in paper feed accuracy and the like, since a dimension of a print image varies, an image shift occurs at a joint of the print image.

SUMMARY

The printing method of the present application is a printing method for performing poster printing in a printing system comprising a plurality of printing apparatuses, the printing method including an image dividing step for dividing original image data to be printed into a plurality of divided image data, an assigning step for assigning each of the divided image data to two or more printing apparatuses among the plurality of the printing apparatuses, an accuracy information acquiring step for acquiring print dimension accuracy information of each of the printing apparatuses assigned with the divided image data, a correcting step for performing dimension correction on a part or all of the divided image data corresponding to the printing apparatus assigned with each of the divided image data based on the acquired print dimension accuracy information, and a printing step for performing printing by the printing apparatus assigned with the divided image data based on the divided image data that underwent the correcting step.

In the printing method described above, the printing dimension accuracy information may include transporting accuracy information of a printing medium transported in a transporting direction of the printing apparatus.

The printing method described above may include a measurement image printing step for printing a transporting accuracy measurement image on the printing medium by each of the plurality of the printing apparatuses and a transporting accuracy measuring step for measuring a length in the transporting direction of the printed transporting accuracy measurement image, and deriving the transporting accuracy information based on the measured length.

The printing method described above may include a reference image selecting step for selecting reference image data as a reference of dimension correction from among the plurality of the divided image data divided, wherein when the printing apparatus assigned with the reference image data is defined as a reference printing apparatus, and a print image printed by the reference printing apparatus based on the reference image data is defined as a reference print image, and a print image adjacent to the reference print image in a direction intersecting the transporting direction is defined as a first adjacent print image, and the divided image data on which the first adjacent print image is based is defined as a first adjacent divided image data, and the printing apparatus assigned with the first adjacent divided image data is defined as a first adjacent printing apparatus, and a measurement value of a length in the transporting direction of the transporting accuracy measurement image printed by the reference printing apparatus is defined as a first measurement value, and a measurement value of a length in the transporting direction of the transporting accuracy measurement image printed by the first adjacent printing apparatus is defined as a second measurement value, in the correcting step, as a dimension correction based on the acquired printing dimension accuracy information, correcting the first adjacent divided image data to be (the first measurement value/the second measurement value) times in a direction along the transporting direction.

In the printing method described above, in the measurement image printing step, as the transporting accuracy measurement image, printing a first transporting accuracy measurement image in a region along one side of sides along the transporting direction of the printing medium, and printing a second transporting accuracy measurement image in a region along another side of the sides along the transporting direction, when one of the print images printed based on the divided image data and adjacent to each other in a direction intersecting the transporting direction is defined as a first print image, and the other of the print images is defined as a second print image, and the divided image data on which the first print image is based is defined as a first divided image data, the divided image data on which the second print image is based is defined as a second divided image data, and the printing apparatus assigned with the first divided image data is defined as a first printing apparatus, the printing apparatus assigned with the second divided image data is defined as a second printing apparatus, and when a side shared by the first print image and the second print image is the other side of the first print image and the one side of the second print image, in the correcting step, based on a measurement value of a length of the second transporting accuracy measurement image printed by the first printing apparatus and a measurement value of a length of the first transporting accuracy measurement image printed by the second printing apparatus, correcting a length of at least one of the first divided image data and the second divided image data in a direction along the transporting direction.

The printing method described above may include a reference image selecting step for selecting reference image data as a reference of dimension correction from among the plurality of the divided image data divided, wherein in the measurement image printing step, as the transporting accuracy measurement image, printing a first transporting accuracy measurement image in a region along one side of sides along the transporting direction of the printing medium, and printing a second transporting accuracy measurement image in a region along another side of the sides along the transporting direction, when the printing apparatus assigned with the reference image data is defined as a reference printing apparatus, and a print image printed by the reference printing apparatus based on the reference image data is defined as a reference print image, and a print image adjacent to the reference print image in a direction intersecting the transporting direction is defined as a first adjacent print image, and the divided image data on which the first adjacent print image is based is defined as a first adjacent divided image data, and the printing apparatus assigned with the first adjacent divided image data is defined as a first adjacent printing apparatus, and a measurement value of a length in the transporting direction of the first transporting accuracy measurement image printed by the reference printing apparatus is defined as a third measurement value, and a measurement value of a length in the transporting direction of the second transporting accuracy measurement image printed by the reference printing apparatus is defined as a fourth measurement value, and a measurement value of a length in the transporting direction of the first transporting accuracy measurement image printed by the first adjacent printing apparatus is defined as a fifth measurement value, and a measurement value of a length in the transporting direction of the second transporting accuracy measurement image printed by the first adjacent printing apparatus is defined as a sixth measurement value, and when a side shared by the reference print image and the first adjacent print image is the one side of the reference print image and the other side of the first adjacent print image, in the correcting step, correcting the first adjacent divided image data to be (the third measurement value/the second measurement value) times in a direction along the transporting direction, and when a side shared by the reference print image and the first adjacent print image is the other side of the reference print image and the one side of the first adjacent print image, in the correcting step, correcting the first adjacent divided image data to be (the fourth measurement value/the fifth measurement value) times in a direction along the transporting direction.

In the printing method described above, when a print image adjacent to the first adjacent print image so as to sandwich the first adjacent print image with the reference print image in a direction intersecting the transporting direction is defined as a second adjacent print image, and the divided image data based on the second adjacent print image is defined as a second adjacent divided image data, and the printing apparatus assigned with the second adjacent divided image data is defined as a second adjacent printing apparatus, and a measurement value of a length in the transporting direction of the transporting accuracy measurement image printed by the second adjacent printing apparatus is defined as a seventh measurement value, in the correcting step, as a dimension correction based on the acquired printing dimension accuracy information, correcting the second adjacent divided image data to be (the first measurement value/the seventh measurement value) times in a direction along the transporting direction.

In the printing method described above, when a print image adjacent to the first adjacent print image so as to sandwich the first adjacent print image with the reference print image in a direction intersecting the transporting direction is defined as a second adjacent print image, and the divided image data based on the second adjacent print image is defined as a second adjacent divided image data, and the printing apparatus assigned with the second adjacent divided image data is defined as a second adjacent printing apparatus, and a measurement value of a length in the transporting direction of the first transporting accuracy measurement image printed by the second adjacent printing apparatus is defined as an eighth measurement value, and a measurement value of a length in the transporting direction of the second transporting accuracy measurement image printed by the second adjacent printing apparatus is defined as a ninth measurement value, and when a side shared by the first adjacent print image and the second adjacent print image is the one side of the first adjacent print image and the other side of the second adjacent print image, in the correcting step, correcting the second adjacent divided image data to be (the third measurement value/the sixth measurement value) (the fifth measurement value/the ninth measurement value) times in a direction along the transporting direction, and when a side shared by the first adjacent print image and the second adjacent print image is the other side of the first adjacent print image and the one side of the second adjacent print image, in the correcting step, correcting the second adjacent divided image data to be (the fourth measurement value/the fifth measurement value)*(the sixth measurement value/the eighth measurement value) times in a direction along the transporting direction.

In the printing method described above, when k, m is an integer greater than or equal to 2, and a column direction is the transporting direction, a row direction is a direction intersecting the transporting direction, in the image dividing step, dividing the original image data into the divided image data having k rows and m columns, and in the reference image selecting step, the reference image data is configured to be selected for each of the divided image data in each of the divided rows.

In the printing method described above, in the measurement image printing step, as the transporting accuracy measurement image, printing a first transporting accuracy measurement image in a region along one side of sides along the transporting direction of the printing medium, and printing a second transporting accuracy measurement image in a region along another side of the sides along the transporting direction, when one of the print images printed based on the divided image data and adjacent to each other in a direction intersecting the transporting direction is defined as a first print image, and the other of the print images is defined as a second print image, and the divided image data on which the first print image is based is defined as a first divided image data, the divided image data on which the second print image is based is defined as a second divided image data, and the printing apparatus assigned with the first divided image data is defined as a first printing apparatus, the printing apparatus assigned with the second divided image data is defined as a second printing apparatus, and a measurement value of a length in the transporting direction of the first transporting accuracy measurement image printed by the first adjacent printing apparatus is defined as a tenth measurement value, and a measurement value of a length in the transporting direction of the second transporting accuracy measurement image printed by the first adjacent printing apparatus is defined as an eleventh measurement value, and a measurement value of a length in the transporting direction of the first transporting accuracy measurement image printed by the second adjacent printing apparatus is defined as a twelfth measurement value, and a measurement value of a length in the transporting direction of the second transporting accuracy measurement image printed by the second adjacent printing apparatus is defined as a thirteenth measurement value, and when a side shared by the first print image and the second print image is the one side of the first print image and the other side of the second adjacent print image, in the correcting step, correcting the second divided image data so that: in a direction along the transporting direction, correcting a length of the one side of the second divided image data to be (the tenth measurement value/the twelfth measurement value) times, and correcting a length of the other side to be (the tenth measurement value/the thirteenth measurement value) times, and correcting a length in a range from the one side to the other side to be a multiple times that the multiple is obtained by proportionally distributing the multiple for correcting the length of the one side and the multiple for correcting the length of the other side, and when a side shared by the first print image and the second print image is the other side of the first print image and the one side of the second adjacent print image, in the correcting step, correcting the second divided image data so that: in a direction along the transporting direction, correcting a length of the one side of the second divided image data to be (the eleventh measurement value/the twelfth measurement value) times, and correcting a length of the other side to be (the eleventh measurement value/the thirteenth measurement value) times, and correcting a length in a range from the one side to the other side to be a multiple times that the multiple is obtained by proportionally distributing the multiple for correcting the length of the one side and the multiple for correcting the length of the other side.

The printing method described above may include a reference image selecting step for selecting reference image data as a reference of dimension correction from among the plurality of the divided image data divided, wherein when the printing apparatus assigned with the reference image data is defined as a reference printing apparatus, and a print image printed by the reference printing apparatus based on the reference image data is defined as a reference print image, and a print image adjacent to the reference print image in a direction intersecting the transporting direction is defined as a first adjacent print image, and the divided image data on which the first adjacent print image is based is defined as a first adjacent divided image data, and the printing apparatus assigned with the first adjacent divided image data is defined as a first adjacent printing apparatus, in the assigning step, assigning the printing apparatuses, which is a combination having the smallest correction amount of dimension of the first adjacent divided image data based on the printing dimension accuracy information of each of the printing apparatuses, to the reference printing apparatus and the first adjacent printing apparatus.

The printing method described above may include a reference image selecting step for selecting reference image data as a reference of dimension correction from among the plurality of the divided image data divided, wherein in the measurement image printing step, as the transporting accuracy measurement image, printing a first transporting accuracy measurement image in a region along one side of sides along the transporting direction of the printing medium, and printing a second transporting accuracy measurement image in a region along another side of the sides along the transporting direction, when the printing apparatus assigned with the reference image data is defined as a reference printing apparatus, and a print image printed by the reference printing apparatus based on the reference image data is defined as a reference print image, and a print image adjacent to the reference print image in a direction intersecting the transporting direction is defined as a first adjacent print image, and the divided image data on which the first adjacent print image is based is defined as a first adjacent divided image data, and the printing apparatus assigned with the first adjacent divided image data is defined as a first adjacent printing apparatus, and a measurement value of a length in the transporting direction of the first transporting accuracy measurement image printed by the reference printing apparatus is defined as a third measurement value, and a measurement value of a length in the transporting direction of the first transporting accuracy measurement image printed by the first adjacent printing apparatus is defined as a fifth measurement value, and a measurement value of a length in the transporting direction of the second transporting accuracy measurement image printed by the first adjacent printing apparatus is defined as a sixth measurement value, and when (the third measurement value–the sixth measurement value)$^2$>(the third measurement value–the fifth measurement value)$^2$, in the correcting step, converting the first adjacent divided image data so that the first adjacent print image rotates with respect to the transporting direction, and correcting the first adjacent divided image data to be (the third measurement value/the fifth measurement value) times in a direction along the transporting direction.

In the printing method described above, the transporting accuracy measurement image may include a start point image indicating a start point of the transporting accuracy measurement image in the transporting direction, and an end point image indicating an end point of the transporting accuracy measurement image in the transporting direction.

A printing system according to the present disclosure includes a plurality of printing apparatuses, and a controlling apparatus configured to control the plurality of the printing apparatuses to perform poster printing by distributed printing, wherein the controlling apparatus includes a storage unit that stores print dimension accuracy information of each of the plurality of the printing apparatuses, and a printing apparatus control unit configured to divide original image data to be printed into a plurality of divided image data, and assign each of the divided image data divided to two or more printing apparatuses of the plurality of the printing apparatuses, and perform dimension correction on a part or all of the divided image data corresponding to each of the printing apparatuses based on the print dimension accuracy information of each of the printing apparatuses assigned with the divided image data, and cause the printing apparatus assigned with the divided image data to execute printing based on the divided image data with the part or all of the divided image data subjected to the dimension correction.

A printing system according to the present disclosure includes a plurality of printing apparatuses, and a controlling apparatus included in any one of the plurality of the printing apparatuses and configured to control the plurality of the printing apparatuses to perform poster printing by distributed printing, wherein the controlling apparatus includes a storage unit that stores print dimension accuracy information of each of the plurality of the printing apparatuses and a printing apparatus control unit configured to divide original image data to be printed into a plurality of divided image data, and assign each of the divided image data divided to two or more printing apparatuses of the plurality of the printing apparatuses, and perform dimension correction on a part or all of the divided image data corresponding to each of the printing apparatuses based on the print dimension accuracy information of each of the printing apparatuses assigned with the divided image data, and cause the printing apparatus assigned with the divided image data to execute printing based on the divided image data with the part or all of the divided image data subjected to the dimension correction.

A printing system according to the present disclosure includes a plurality of printing apparatuses and a controlling apparatus configured to control the plurality of the printing apparatuses to perform poster printing by distributed printing, wherein each printing apparatus of the plurality of the printing apparatuses includes a storage unit that stores print dimension accuracy information of the printing apparatus its own, the controlling apparatus includes a printing apparatus control unit configured to divide original image data to be printed into a plurality of divided image data, and assign each of the divided image data divided to two or more printing apparatuses of the plurality of the printing apparatuses, and acquire the print dimension accuracy information from each of the printing apparatuses assigned with the divided image data, and perform dimension correction on a part or all of the divided image data corresponding to each of the printing apparatuses based on the print dimension accuracy information acquired, and cause the printing apparatus assigned with the divided image data to execute printing based on the divided image data with the part or all of the divided image data subjected to the dimension correction.

A printing system according to the present disclosure includes a plurality of printing apparatuses, and a controlling apparatus configured to control the plurality of the printing apparatuses to perform poster printing by distributed printing, wherein the controlling apparatus includes a printing apparatus control unit configured to divide an original image data to be printed into a plurality of divided image data, and assign each of the divided image data divided to two or more printing apparatuses of the plurality of the printing apparatuses, each printing apparatus of the plurality of the printing apparatuses includes, a storage unit configured to store print dimension accuracy information of the printing apparatus, a printing unit configured to perform printing on a printing medium, and a printing control unit configured to perform dimension correction on the divided image data that is assigned, based on the print dimension accuracy information, and execute printing on the printing apparatus based on the divided image data that was performed the dimension correction.

A printing system according to the present disclosure includes a plurality of printing apparatuses and a controlling apparatus included in any one of the plurality of the printing apparatuses and configured to control the plurality of the printing apparatuses to perform poster printing by distributed printing, wherein each printing apparatus of the plurality of the printing apparatuses includes a storage unit that stores its own print dimension accuracy information, the controlling apparatus includes a printing apparatus control unit configured to divide original image data to be printed into a plurality of divided image data, and assign each of the divided image data divided to two or more printing apparatuses of the plurality of the printing apparatuses, and acquire the print dimension accuracy information from each of the printing apparatuses assigned with the divided image data, and perform dimension correction on a part or all of the divided image data corresponding to each of the printing apparatuses based on the print dimension accuracy information acquired, and cause the printing apparatus assigned with the divided image data to execute printing based on the divided image data with the part or all of the divided image data subjected to the dimension correction.

A printing apparatus according to the present disclosure constitutes a printing system for performing poster printing by distributed printing, the printing apparatus includes a storage unit configured to store print dimension accuracy information of the printing apparatus its own, a printing unit configured to perform printing on a printing medium.

A printing apparatus according to the present disclosure may include a printing control unit configured to control the printing unit, and a transporting unit configured to transport the printing medium, wherein the printing dimension accuracy information includes transporting accuracy information when the transporting unit transports the printing medium in a transporting direction, and the printing control unit is configured to correct the transporting amount of the printing medium transported by the transporting unit based on the transporting accuracy information.

A program according to the present application is a program controlling poster printing by distributed printing in a printing system including a plurality of printing apparatuses, the programs comprising an image dividing function for dividing original image data to be printed into a plurality of divided image data, an assigning function for assigning each of the divided image data to two or more printing apparatuses among the plurality of the printing apparatuses, an accuracy information acquiring function for acquiring print dimension accuracy information of each of the printing apparatuses assigned with the divided image data, and a correcting function for performing dimension correction on a part or all of the divided image data corresponding to each of the printing apparatuses based on the acquired print dimension accuracy information.

DESCRIPTION OF EXEMPLARY EMBODIMENTS

1. Embodiment 1

Figure 1:
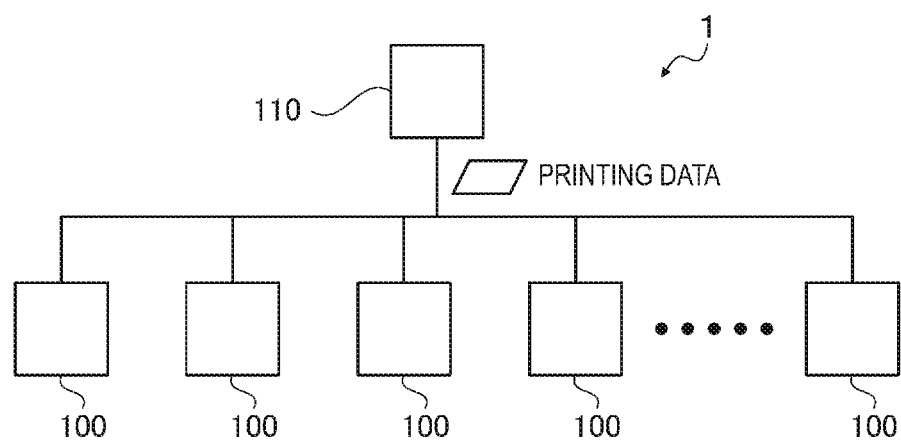
FIG. 1 is a block diagram illustrating a configuration of a printing system according to Embodiment 1.

FIG. 1 is a block diagram illustrating a configuration of a printing system according to Embodiment 1.

The printing system 1 includes a plurality of printing apparatuses 100 and a controlling apparatus 110 to which the plurality of the printing apparatuses 100 are connected and configured to control distributed printing by the plurality of the printing apparatuses 100.

The printing apparatus 100 is an ink-jet serial printer that prints a desired image on a printing medium, based on print data received from the controlling apparatus 110. The printing system 1 is configured to execute poster printing by distributed printing of a plurality of printing apparatuses 100.

Here, the poster printing refers to a printing in which a plurality of divided print images are joined to generate a large print image. Additionally, the print image printed by the poster printing is not limited to a poster.

Figure 2:
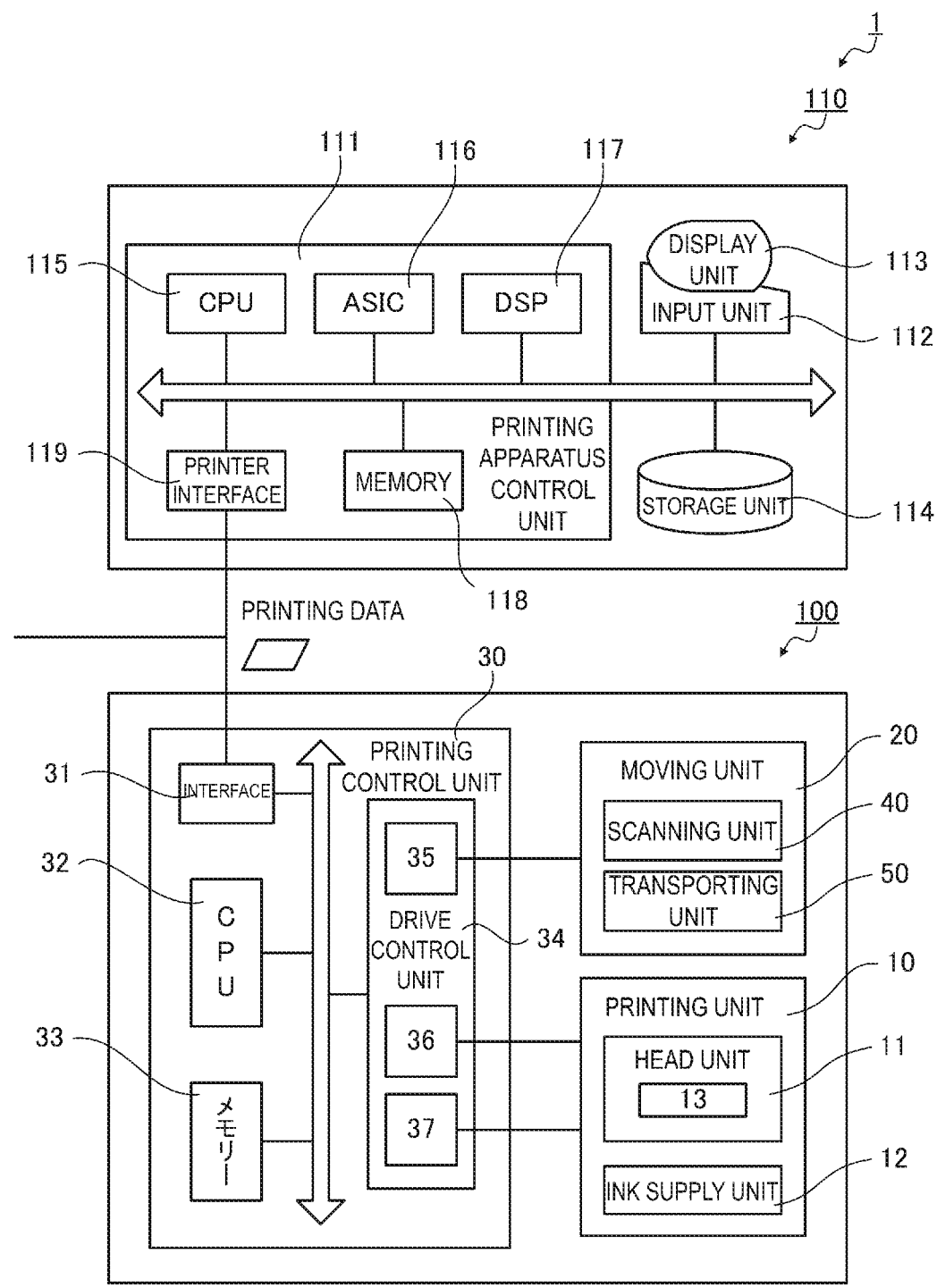
FIG. 2 is a block diagram illustrating a configuration of a printing apparatus and a controlling apparatus.

FIG. 2 is a block diagram illustrating a configuration of a printing apparatus 100 and a controlling apparatus 110. Note that the printing apparatus 100 illustrates one of the plurality of the printing apparatuses 100 constituting the printing system 1.

The controlling apparatus 110 includes a printing apparatus control unit 111, an input unit 112, a display unit 113, a storage unit 114, and the like, and controls a print job that performs printing by the printing apparatus 100. As a preferred example, the controlling apparatus 110 is configured using a personal computer.

The program as software or firmware operated by the controlling apparatus 110 includes a general image processing application program that deals with image data to be printed, a control of the printing apparatus 100, and a printer driver program that generates print data for causing the printing apparatus 100 to perform printing. In the following description, the image processing application program is simply referred to as an application. In addition, the printer driver program is simply referred to as a printer driver.

The printing apparatus control unit 111 includes a CPU 115, an ASIC 116, a DSP 117, a memory 118, a printer interface 119, and the like, and performs centralized management of the entire printing system 1. Here, CPU means Central Processing Unit, ASIC means Application Specific Integrated Circuit, and DSP means Digital Signal Processor. The input unit 112 is an information input unit. Specifically, the input unit 112 is, for example, a port or the like for connecting a keyboard, a mouse pointer, or an information input device.

The display unit 113 is an information display unit, and under the control of the printing control unit 111, the display unit 113 displays information input from the input unit 112, images printed on the printing apparatus 100, and information related to the print job, and the like. Additionally, the input unit 112 and the display unit 113 may be an integrated touch panel. The storage unit 114 is a rewritable storage medium such as a hard disk drive or a memory card, and stores a program operated by the printing apparatus control unit 111, an image to be printed, and information related to the print job, and the like. The memory 118 is a storage medium that secures a region for storing programs run by the CPU 115, a work region in which such programs run, and the like, and includes storage elements such as a RAM and an EEPROM. Here, RAM means Random access memory, EEPROM means Electrically Erasable Programmable Read-Only Memory.

The printing apparatus 100 includes a printing unit 10, a moving unit 20, a printing control unit 30, and the like. The printing apparatus 100 that has received the print data from the controlling apparatus 110 controls, by the printing control unit 30, the printing unit 10 and the moving unit 20 based on the print data to print an image on the printing medium.

The print data is data for forming image acquired by performing conversion processing on the image data with the application and the printer driver included in the controlling apparatus 110 such that the image data can be printed by the printing apparatus 100, and includes commands for controlling the printing apparatus 100. When poster printing is performed by distributed printing, the controlling apparatus 110 performs the poster printing by that divides an original image data to be printed into a plurality of divided image data, and separately transmits the plurality of printed data converted based on the respective divided image data to the shared printing apparatus 100. A description of the poster printing by distributed printing will be described later.

The printing unit 10 includes a head unit 11, and an ink supply unit 12.

The head unit 11 includes a printing head 13 including a plurality of nozzles for discharging printing ink for printing as ink droplets.

The ink supply 12 supplies ink to the head unit 11.

The moving unit 20 includes the scanning unit 40 and the transporting unit 50, and the like, and moves the printing medium relatively with respect to the printing head 13 under the control of the printing control unit 30.

The scanning unit 40 reciprocates a carriage on which the head unit 11 is mounted in a scanning direction. The transporting unit 50 transports the printing medium in a transporting direction intersecting the scanning direction. A description of the carriage, and the mechanism for moving the carriage in the scanning direction is omitted.

The printing head 13 including the head unit 11 mounted on the carriage, discharges an ink droplet onto the printing medium under the control of the printing apparatus control unit 30 while moving in the scanning direction, and thus a row of dots along the scanning direction is formed on the printing medium. Partial images each printed as a result of the dot formation involved in the scanning direction are joined together in a transporting direction intersecting with the scanning direction to print a desired image based on the image data.

Note that the printing unit 10 is configured by a serial head that reciprocates in the scanning direction as described above, but the printing unit 10 may be configured by a line head in which the nozzles are arranged across a width of the printing medium in the scanning direction.

The printing control unit 30 includes an interface 31, a CPU 32, a memory 33, a drive control unit 34, and the like, and controls the printing apparatus 100.

The interface 31 is connected to the printer interface 119 of the controlling apparatus 110, and performs transmission and reception of data between the controlling apparatus 110 and the printing apparatus 100.

The CPU 32 is an arithmetic processing unit for overall control of the printing apparatus 100.

The memory 33 is a storage medium that secures a region for storing programs run by the CPU 32, a work region in which such programs run, and the like, and includes storage elements such as a RAM and an EEPROM. In addition, the memory 33 is a storage unit in the printing apparatus 100, and can store information such as necessary variable in the control performed by the printing control unit 30.

The CPU 32 controls the printing unit 10, and the moving unit 20 via the drive control unit 34 in accordance with the program and variable stored in the memory 33 and the print data received from the printing control apparatus 110.

The drive control unit 34 includes firmware operating based on the control of the CPU 32 to control driving of the head unit 11 and ink supply unit 12 of the printing unit 10, and the scanning unit 40 and transporting unit 50 of the moving unit 20. The drive control unit 34 includes drive control circuits including a moving control circuit 35, a discharging control circuit 36, and a discharge drive circuit 37, and a ROM and a flash memory incorporating firmware controlling the drive control circuits. ROM and flash memory containing firmware for controlling the drive control circuit are not shown. Here, ROM means Read-Only Memory.

The moving control circuit 35 is a circuit that generates a signal for controlling the scanning unit 40 and the sub-scanning unit 50 of the moving unit 20, based on the printing data, according to an instruction from the CPU 32.

The discharging control circuit 36 is a circuit configured to select the nozzle for discharging ink, select the amount to be discharged, control the discharge timing, and the like, based on the print data in accordance with instructions from the CPU 32. The discharging drive circuit 37 is a circuit configured to drive the printing head 13 to discharge and drive the printing head 13.

Next, a printing method for performing poster printing in the present embodiment will be described.

Figure 3:
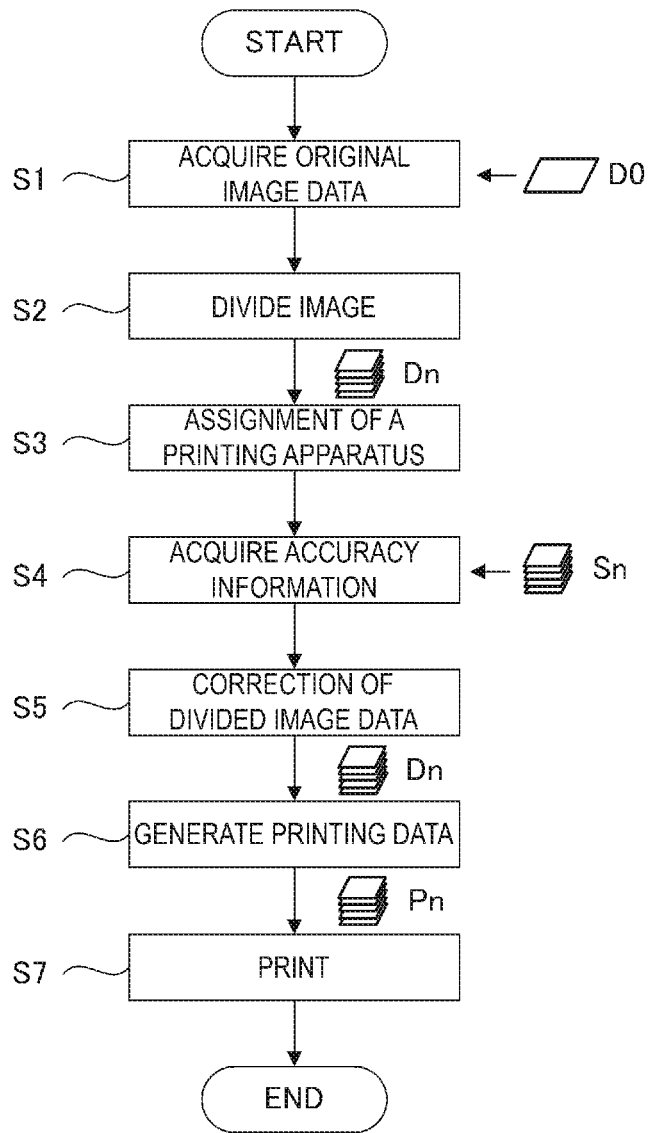
FIG. 3 is a flowchart illustrating a basic flow of a printing method according to the Embodiment 1.

FIG. 3 is a flowchart illustrating a basic flow of a printing method according to the present embodiment.

First, in the control apparatus 110, the printing apparatus control unit 111 receives, as step S1, original image data D0 to be printed in poster printing from the external information input device. The original image data D0 can be stored in the storage unit 114 and read from the storage unit 114 as necessary.

Next, in order to perform poster printing by distributed printing on the plurality of printing apparatuses 100, as step S2, the printing apparatus control unit 111 divides the original image data D0 into a plurality of divided image data Dn. A division specification such as a division number for dividing the original image data D0 into a plurality of divided image data Dn and the size of each divided image data Dn, and the like, is determined by the size of a large printed matter created by joining print images that are divided and printed, the size of a print image that can be printed by each printing apparatus 100, and the like. Based on these information, it may be configured to be automatically divided by the printer driver, or the user may individually designate the division specification using the printer driver as an interface. As necessary, the divided image data Dn can be stored in the 114 and read from the 114. In the present embodiment, step S2 corresponds to an image dividing step.

Next, the printing apparatus control unit 111 assigns, as step S3, a printing apparatus that prints based on divided each divided image data Dn. The number of printing apparatuses 100 to be assigned is at least two or more in order to perform distributed printing. When the number of divisions n obtained by dividing the original image data D0 into the divided image data Dn is smaller than the number of printing apparatuses 100 that can execute printing, the printing efficiency is highest to be assigned to the n printing apparatuses 100, but in the present embodiment, an algorithm for assigning each of the divided image data Dn to any one of the printing apparatuses 100 is particularly specified.

In the present embodiment, step S3 corresponds to an assigning step.

Next, as step S4, the printing apparatus control unit 111 acquires the print dimension accuracy information Sn of each of the printing apparatuses assigned with the divided image data 100. The print dimension accuracy information Sn is information obtained by converting individual differences in print dimension accuracy due to mechanical variations or the like of the printing apparatus 100 into numerical values, and is input from an external information input device in advance and stored in the storage unit 114. In step S4, the data is read from the storage unit 114.

In the present embodiment, the printing dimension accuracy information Sn includes transporting accuracy information Cn of a printing medium transported in a transporting direction of the printing apparatus 100. The transporting accuracy information Cn and the acquisition procedure of the transporting accuracy information Cn are described later.

Note that, when executing printing, rather than reading the printing dimension accuracy information Sn from the storage unit 114, the print dimension accuracy information Sn of each printing apparatus 100 may be acquired as information input from an external information input device.

In the present embodiment, step S4 corresponds to the accuracy information acquiring step.

Next, as step S5, the printing apparatus control unit 111 performs dimension correction on a part or all of the divided image data Dn corresponding to each of the printing apparatuses 100 based on the printing dimension accuracy information Sn of each of the printing apparatuses assigned with the divided image data 100. That is, when a difference occurs in the dimension of the print image due to mechanical variation or the like of each of the printing apparatuses 100, in order to correct this difference, the divided image data Dn is corrected in accordance with the size of the conveyance accuracy information Cn, and the dimension of the print images are made to coincide with each other.

Correction of the specific divided image data Dn corresponding to the size of the transporting accuracy information Cn will be described later.

In the present embodiment, step S5 corresponds to a correcting step.

Next, as step S6, the printing apparatus control unit 111 generates a plurality of print data Pn from the respective divided image data Dn that underwent the correction process in step S6, and as step S7, the printing apparatus control unit 111 transmits the print data Pn corresponding to each of the printing apparatuses assigned with the divided image data 100, thereby causing the printing apparatuses 100 to execute printing.

In the present embodiment, the steps S6 and S7 corresponds to a printing step.

Specifically, the print images printed by the respective printing apparatuses 100 are collected and joined to the printed printing medium, thereby obtaining a large print image.

Note that, in the flowchart described above, after performing the image dividing step in step S2, the assigning step is performed in step S3, but before the image dividing step of step S2, the used printing apparatus determining step for determining the printing apparatus used to perform poster printing by distributed printing may be performed. In the used printing apparatus determining step, when performing distributed printing, the number of printing apparatuses 100 to be used is at least two or more. The printing apparatus 100 used for the distributed printing may be individually designated by the user via the input unit 112, or may be automatically determined by the control device 110 based on the status of the print job input to each printing apparatus 100, the size of the set print medium, the remaining amount of print medium, the remaining amount of ink, and the like. Before the image partitioning step of step S2, when performing the used printing apparatus determining step, in the assigning step of step S3, each divided image data Dn divided in the image dividing step of step S2 is assigned to the printing apparatus 100 selected as the printing apparatus used for distributed printing in the used printing apparatus determination step.

Next, the transporting accuracy information Cn and the acquisition procedure of the transporting accuracy information Cn in the step S4 are described later.

Figure 4:
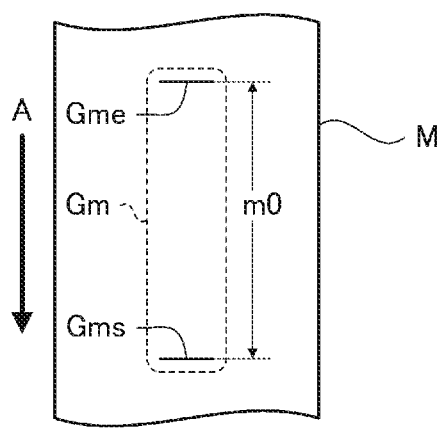
FIG. 4 is a conceptual diagram illustrating a transporting accuracy measurement image for obtaining transporting accuracy information.

FIG. 4 is a conceptual diagram illustrating a transporting accuracy measurement image for obtaining transporting accuracy information. In FIG. 4, the transporting direction is indicated by A, and the printing medium is indicated by M.

As illustrated in FIG. 4, the transporting accuracy measurement image Gm includes a start point image Gms indicating a start point of the transporting accuracy measurement image Gm in the transporting direction, and an end point image Gme indicating an end point of the transporting accuracy measurement image Gm in the transporting direction. The start point image Gms and the end point image Gme are line segments orthogonal to the transporting direction. Here, the transporting direction refers to the printing direction of the printing medium for executing printing of the transporting accuracy measurement image Gm. Note that the start point image Gms and the end point image Gme need not necessarily be a line segment, but may be marks that can measure the length of the transporting accuracy measurement image Gm in the transporting direction. Furthermore, the transporting accuracy measurement image Gm is not limited to the start point image Gms and the end point image Gme, and may be an image in which a scale is provided between the start point image Gms and the end point image Gme along the transporting direction as a ruler, and it also may be a line segment continuous in the transporting direction from the start point image Gms to the end point image Gme.

The transporting accuracy information Cn is acquired by measuring the length in the transporting direction of the transporting accuracy measurement image Gm printed by each of the printing apparatuses 100, that is, the distance in the transporting direction between the start point image Gms and the end point image Gme acquired by measuring m0 shown in FIG. 4. As described above, the printing method according to the present embodiment includes a measurement image printing step for printing a transporting accuracy measurement image Gm on the printing medium by each of the plurality of the printing apparatuses 100 and a transporting accuracy measuring step for measuring a length in the transporting direction of the printed transporting accuracy measurement image Gm, and deriving the transporting accuracy information Cn based on the measured length.

More specifically, the transporting accuracy measurement image Gm is, for example, a print image based on print data in which the distance between the start point image Gms and the end point image Gme in the transporting direction is a reference length of 1000 mm. By printing this transporting accuracy measurement image Gm by each printing apparatus 100, and measuring the distance between the start point image Gms and the end point image Gme printed on the actual printing medium, an error in the printing dimension of each printing apparatus 100 in the transporting direction due to, for example, variations in transport accuracy is obtained.

In the present embodiment, the measurement value of the distance between the start point image Gms and the end point image Gme is taken as the transporting accuracy information Cn. Note that, for example, the value of the ratio of the measurement value to the reference length may be serving as the transporting accuracy information Cn. In addition, the print dimension accuracy information Sn includes ID information such as the transporting accuracy information Cn and the apparatus number of the printing apparatus 100 corresponding to the transporting accuracy information Cn.

As described above, the printing system 1 includes a plurality of printing apparatuses 100 and a controlling apparatus 110 configured to control the plurality of the printing apparatuses to perform poster printing by distributed printing 100. the controlling apparatus 100 includes a storage unit 114 that stores print dimension accuracy information Sn of each of the plurality of the printing apparatuses 100, and a printing apparatus control unit 111 configured to divide original image data D0 to be printed into a plurality of divided image data Dn, and assign each of the divided image data Dn divided to two or more printing apparatuses 100 of the plurality of the printing apparatuses 100, and perform dimension correction on a part or all of the divided image data Dn corresponding to each of the printing apparatuses 100 based on the print dimensional accuracy information Sn of each of the assigned printing apparatus 100, and execute printing on the printing apparatus 100 to which the divided image data Dn is assigned based on the divided image data Dn in which the part or all of the divided image data Dn that was performed the dimension correction.

Furthermore, in the controlling apparatus 110, it is configured that a program PR for performing a series of control from step S1 to step S7 is included in the printer driver. In other words, the program PR is a program PR for controlling poster printing by distributed printing in a printing system 1 including a plurality of printing apparatus 100, the programs PR includes an image dividing function for dividing original image data D0 to be printed into a plurality of divided image data Dn, an assigning function for assigning each of the divided image data Dn to two or more printing apparatuses 100 among the plurality of the printing apparatuses 100, an accuracy information acquiring function for acquiring print dimension accuracy information Sn of each of the printing apparatuses assigned with the divided image data 100 and a correcting function for performing dimension correction on a part or all of the divided image data Dn corresponding to each of the printing apparatuses 100 based on the acquired print dimension accuracy information Sn.

Next, the correction of the divided image data Dn in step S5 described above will be specifically described with reference to some embodiments.

1.1. EXAMPLE 1

Figure 5:
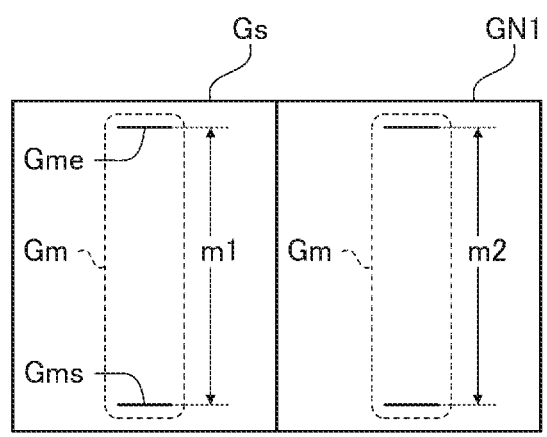
FIG. 5 is an explanatory diagram illustrating a case in which a first adjacent print image is adjacent to one side of a reference print image in Example 1.
Figure 6:
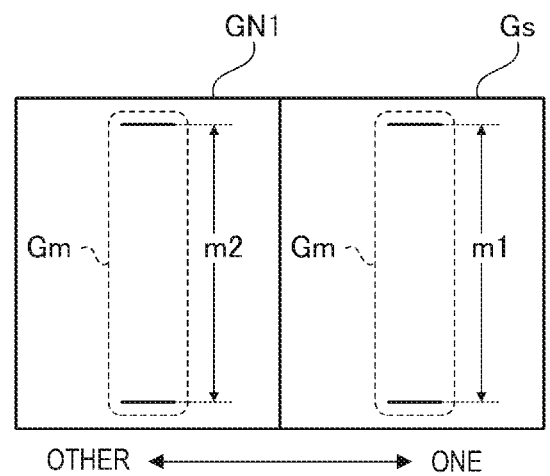
FIG. 6 is an explanatory diagram illustrating a case in which the first adjacent print image is adjacent to the other side of the reference print image in the Example 1.

FIG. 5 and FIG. 6 are explanatory diagrams of Example 1.

The printing method according to Example 1 includes a reference image selecting step, in which before the correcting step a reference image data Ds as a reference of dimension correction is selected from the plurality of divided image data Dn divided. The reference image data Ds is image data corresponding to the print image serving as dimension reference when correcting the divided image data Dn. The reference image data Ds is a dimension reference for correcting the divided image data Dn based on the adjacent print image in the transporting direction during printing when joining the print image serving as the dimension reference.

Here, the printing apparatus 100 to which the reference image data Ds is assigned is defined as a reference printing apparatus 100s, and based on the reference image data Ds, the print image printed by the reference printing apparatus 100s is defined as the reference print image Gs.

In addition, a print image adjacent to the reference print image Gs in a direction intersecting the transporting direction is defined as a first adjacent print image GN1, and the divided image data DN based on the first adjacent print image GN1 is defined as a first adjacent divided image data DN1, and the printing apparatus 100 to which the first adjacent divided image data DN1 is assigned is defined as a first adjacent printing apparatus 100N1.

In addition, a measurement value of a length in the transporting direction of the transporting accuracy measurement image Gm printed by the reference printing apparatus 100s is defined as a first measurement value m1, and a measurement value of a length in the transporting direction of the transporting accuracy measurement image Gm printed by the first adjacent printing apparatus 100N1 is defined as a second measurement value m2.

FIG. 5 illustrates a case in which a first adjacent print image GN1 is adjacent to one side of a reference print image Gs, and FIG. 6 illustrates a case in which the first adjacent print image GN1 is adjacent to the other side of the reference print image Gs.

Note that in FIG. 5 and FIG. 6, although the transporting accuracy measurement image Gm is indicated in each of the reference print image Gs and the first adjacent print image GN1, it does not indicate that each of the reference print image Gs and the first adjacent print image GN1 includes the transporting accuracy measurement image Gm, but indicates that the first measurement value m1 is corresponding to the reference printing apparatus 100s that prints the reference print image Gs, and the second measurement value m2 is corresponding to the first adjacent printing apparatus 100N1 that prints the first adjacent print image GN1.

Furthermore, the directions indicating the one side and the other side may be opposite to the illustrated direction in the relationship described as a pair.

In the accuracy information acquiring step of Example 1, the transporting accuracy information Cn is acquired as the print dimension accuracy information Sn, and specifically, the first measurement value m1 and the second measurement value m2 are acquired, and in the correcting step, as a dimension correction based on the acquired first measurement value m1 and the second measurement value m2, correcting the first adjacent divided image data DN1 to be (the first measurement value m1/the second measurement value m2) times in a direction along the transporting direction.

For example, when the first measurement value m1 is 1010 mm and the second measurement value of m2 is 1015 mm, the first adjacent divided image data DN1 is corrected so that the length of the first adjacent print image GN1 is corrected to be (the first measurement value m1/the second measurement value m2) that is (1010 mm/1015 mm) times in the transporting direction.

As a result of the correction, for example, when the first adjacent divided image data DN1 is image data for printing the transporting accuracy measurement image Gm, the length of the second measurement value m2 in the first adjacent printing apparatus 100N1 is 1015 mm*(1010 mm/1015 mm), that is 1010 mm, which is equal to the first measurement value m1 in the reference printing apparatus 100s.

1.2. EXAMPLE 2

Figure 7:
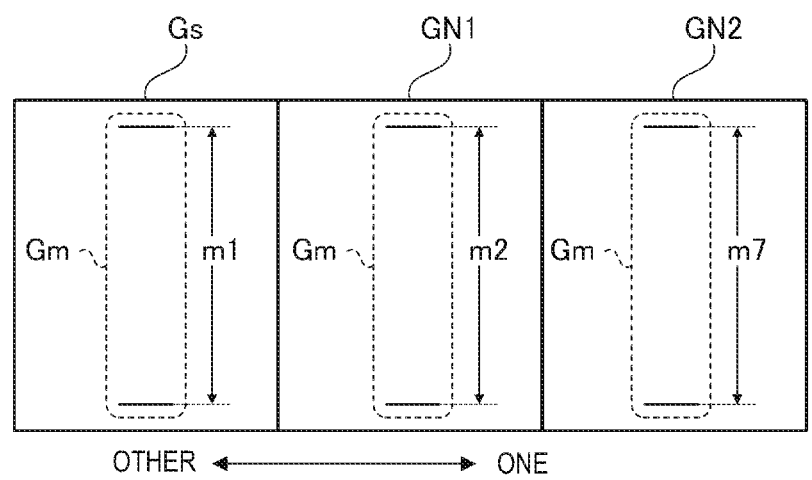
FIG. 7 is an explanatory diagram illustrating a case in which the first adjacent print image is adjacent to one side of the reference print image and a second adjacent print image is adjacent to one side of the first adjacent print image in Example 2.
Figure 8:
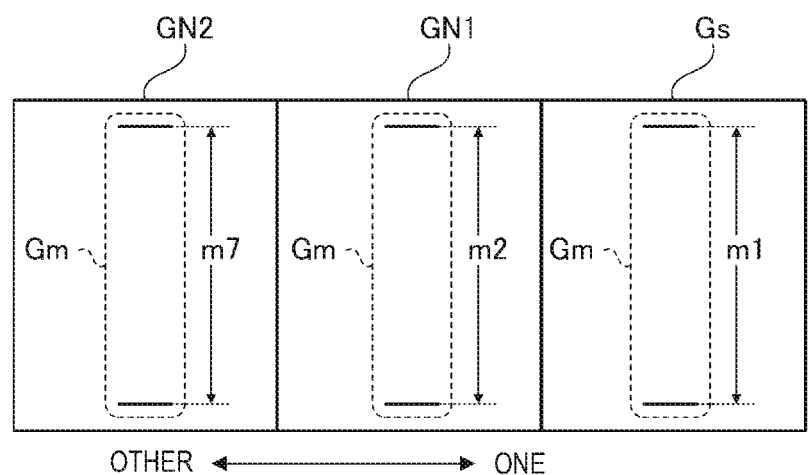
FIG. 8 is an explanatory diagram illustrating a case in which the first adjacent print image is adjacent to the other side of the reference print image and the second adjacent print image is adjacent to the other side of the first adjacent print image in Example 2.

FIG. 7 and FIG. 8 are explanatory diagrams of Example 2.

Example 2 illustrates a correcting method when there is a print image adjacent to the first adjacent print image GN1 so as to sandwich the first adjacent print image GN1 with the reference print image Gs in a direction intersecting the transporting direction.

Here, in a direction intersecting the transporting direction, a print image adjacent to the first adjacent print image GN1 so as to sandwich the first adjacent print image GN1 with the reference print image Gs is defined as a second adjacent print image GN2, and the divided image data DN based on the second adjacent print image GN2 is defined as a second adjacent divided image data DN2, and the printing apparatus 100 to which the second adjacent divided image data DN2 is assigned is defined as a second adjacent printing apparatus 100N2.

In addition, a measurement value of a length in the transporting direction of the transporting accuracy measurement image Gm printed by the second adjacent printing apparatus 100N2 is defined as a seventh measurement value m7.

FIG. 7 illustrates a case in which the first adjacent print image GN1 is adjacent to one side of the reference print image Gs and a second adjacent print image GN2 is adjacent to one side of the first adjacent print image GN1. FIG. 8 illustrates a case in which the first adjacent print image GN1 is adjacent to the other side of the reference print image Gs and the second adjacent print image GN2 is adjacent to the other side of the first adjacent print image GN1.

Note that, in FIG. 7 and FIG. 8, although the transporting accuracy measurement image Gm is indicated in each of the reference print image Gsm the first adjacent print image GN1 and the second adjacent print image GN2, it does not indicate that each of the reference print image Gs, the first adjacent print image GN1 and the second adjacent print image GN2 includes the transporting accuracy measurement image Gm, but indicates that the first measurement value m1 is corresponding to the reference printing apparatus 100s that prints the reference print image Gs, and the second measurement value m2 is corresponding to the first adjacent printing apparatus 100N1 that prints the first adjacent print image GN1, and the seventh measurement value m7 is corresponding to the second printing apparatus 100N2 that prints the second adjacent print image GN2.

In the accuracy information acquiring step of Example 2, the transporting accuracy information Cn is acquired as the print dimension accuracy information Sn, and specifically, the first measurement value m1, the second measurement value m2 and the seventh measurement value m7 are acquired, and in the correcting step, as a dimension correction based on the acquired first measurement value m1, the second measurement value m2 and the seventh measurement value m7, correcting the first adjacent divided image data DN1 to be (the first measurement value m1/the second measurement value m2) times in a direction along the transporting direction, correcting the second adjacent divided image data DN2 to be (the first measurement value m1/the seventh measurement value m7) times in a direction along the transporting direction.

According to the present embodiments, the following advantages can be obtained.

The printing method according to the present embodiment includes a correcting step for performing dimension correction on a part or all of the divided image data Dn corresponding to each of the printing apparatuses 100 based on the printing dimension accuracy information Sn of each of the printing apparatuses 100 to which a plurality of divided image data Dn obtained by dividing the original image data D0 are assigned Thus, by joining the plurality of printed matters printed, for example, in poster printing for completing a large printed matter such as an oversized poster, variation in the dimension of the print image caused by individual differences of the plurality of printing apparatuses 100 is corrected. As a result, in poster printing, the occurrence of image shift in the print image of the joint is suppressed.

In addition, the printing dimension accuracy information Sn includes transporting accuracy information Cn of a printing medium transported in a transporting direction of the printing apparatus 100. Therefore, in poster printing, variation in the dimension of the print image caused by the individual difference of the transporting accuracy of the plurality of printing apparatuses 100 is corrected. As a result, in poster printing, the occurrence of image shift in the print image of the joint is suppressed.

In addition, the printing method according to the present embodiment includes a measurement image printing step for printing a transporting accuracy measurement image Gm on the printing medium by each of the plurality of the printing apparatuses 100 and a transporting accuracy measuring step for measuring a length in the transporting direction of the printed transporting accuracy measurement image Gm, and deriving the transporting accuracy information Cn based on the measured length. In other words, in the correcting step, performing dimension correction on a part or all of the divided image data Dn corresponding to each of the printing apparatuses 100 based on the printing dimension accuracy information Sn including the transporting accuracy information Cn obtained as a result of measuring the transporting accuracy measurement image Gm printed by each printing apparatus 100. Therefore, variation in the dimension of the print image caused by the individual difference of the transporting accuracy of the plurality of printing apparatuses 100 is corrected more effectively. As a result, in poster printing, the occurrence of image shift in the print image of the joint is suppressed more effectively.

In addition, the printing method according to Example 1 of the present embodiment includes a reference image selecting step for selecting a reference image data Ds as a reference of dimension correction from the plurality of divided image data Dn divided. In addition, in the correcting step, based on the first measurement value m1 as the transporting accuracy information Cn of the printing apparatus 100 to which the reference image data Ds is assigned and the second measurement value m2 as the transporting accuracy information Cn of the printing apparatus 100 that prints the print image adjacent to the reference print image Gs printed based on the reference image data Ds, dimension correction of the corresponding divided image data Dn is performed. Specifically, based on the first measurement value m1 that is a measurement value of the length in the transporting direction of the transporting accuracy measurement image Gm printed by the printing apparatus 100 to which the reference image data Ds is assigned and the second measurement value m2 that is a measurement value of the length in the transporting direction of the transporting accuracy measurement image Gm printed by the printing apparatus 100 that prints a print image adjacent to the print image that is printed based on the reference image data Ds, the divided image data Dn adjacent to the reference image data Ds is corrected to be (the first measurement value m1/the second measurement value m2) times. In other words, the dimension of the adjacent print image is corrected with reference to the print image based on the reference image data Ds. As a result, it is possible to specify the image that you want to suppress the shift of the print image of the joint, and the variation of dimension between the designated print images is corrected more effectively, the convenience for the user is improved.

Furthermore, in the correcting step of Example 2 in the present embodiment, based on the first measurement value m1 as the transporting accuracy information Cn of the printing apparatus 100 to which the reference image data Ds is assigned, and the seventh measurement value m7 as the transporting accuracy information Cn of the printing apparatus 100 that prints an adjacent print image in the same direction with respect to a print image adjacent to a reference printed image Gs printed based on the reference image data Gs, dimension correction of the corresponding divided image data Dn is performed. Specifically, the dimension of the adjacent print image with reference to the print image based on the reference image data Ds can be corrected to be (the first measurement value m1/the second measurement value m2) times, and based on the print image based on the reference image data Ds, the print image that is adjacent to the adjacent print image sandwiched therebetween can be corrected to be (first measurement value m1/seventh measurement value m7) times. As a result, the dimension of the print image that is continuously adjacent to a print image is corrected with reference to the print image based on the reference image data Ds, and the occurrence of shift of the joint in adjacent print images is suppressed.

Further, the transporting accuracy measurement image Gm includes a start point image Gms and an end point image Gme, since no image is formed between the start point image Gms and the end point image Gme, the printing medium can be effectively used.

Further, the printing system 1 includes a plurality of printing apparatuses 100 and a controlling apparatus 110 configured to control the plurality of the printing apparatuses to perform poster printing by distributed printing 100. The controlling apparatus 100 includes a storage unit 114 that stores print dimension accuracy information Sn of each of the plurality of the printing apparatuses 100, and a printing apparatus control unit 111 configured to divide original image data D0 to be printed into a plurality of divided image data Dn, and assign each of the divided image data Dn divided to two or more printing apparatuses 100 of the plurality of the printing apparatuses 100, and perform dimension correction on a part or all of the divided image data Dn corresponding to each of the printing apparatuses 100 based on the print dimensional accuracy information Sn of each of the assigned printing apparatus 100, and execute printing on the printing apparatus 100 to which the divided image data Dn is assigned based on the divided image data Dn in which the part or all of the divided image data Dn that was performed the dimension correction.

In other words, the controlling apparatus 110 included in the printing system 1 performs dimension correction on a part or all of the divided image data Dn corresponding to each of the printing apparatuses 100 based on the printing dimension accuracy information Sn of each of the printing apparatuses 100 to which a plurality of divided image data Dn obtained by dividing the original image data D0 are assigned Therefore, according to the printing system 1, by joining the plurality of printed matters printed, for example, in poster printing for completing a large printed matter such as an oversized poster, variation in the dimension of the print image caused by individual differences of the plurality of printing apparatuses 100 is corrected. As a result, in poster printing, the occurrence of image shift in the print image of the joint is suppressed.

Further, in the controlling apparatus 110, the program PR for performing a series of controls from step S1 to step S7 includes a correcting function for performing dimension correction on a part or all of the divided image data Dn corresponding to each of the printing apparatuses 100 based on the printing dimension accuracy information Sn of each of the printing apparatuses 100 to which a plurality of divided image data Dn obtained by dividing the original image data D0 are assigned. Thus, by joining the plurality of printed matters printed, for example, in poster printing for completing a large printed matter such as an oversized poster, variation in the dimension of the print image caused by individual differences of the plurality of printing apparatuses 100 is corrected. As a result, in poster printing, the occurrence of image shift in the print image of the joint is suppressed.

2. Embodiment 2

In Exemplary Embodiment 1, it was described that dimension correction is performed to a part or all of the divided image data Dn corresponding to each printing apparatus 100, based on one printing dimension accuracy information Sn for each printing apparatus 100 to which the divided image data Dn is assigned. Specifically, the correction of the divided image data Dn is performed based on one transporting accuracy information Cn for each printing apparatus 100, more Specifically, based on the measurement value of the length of one transporting accuracy measurement image Gm in the transporting direction for each printing apparatus 100 measured as the transporting accuracy information Cn. In contrast, in Exemplary Embodiment 2, the correction of the divided image data Dn is performed based on the measurement value of the length in the transporting direction of the two transporting accuracy measurement images Gm corresponding to the two sides along the transporting direction of the print image to be printed for each printing apparatus 100.

Details will be described below. Note that the configurations as in the embodiment 1 are referenced using like numbers, and no detailed descriptions for such configurations are provided below.

Figure 9:
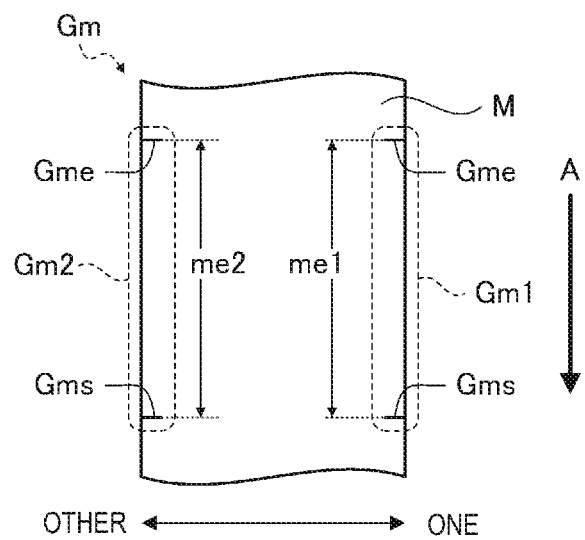
FIG. 9 is a conceptual diagram illustrating a transporting accuracy measurement image according to Embodiment 2.

FIG. 9 is a conceptual diagram illustrating a transporting accuracy measurement image Gm according to Embodiment 2. In FIG. 9, the transporting direction is indicated by A, and the printing medium is indicated by M.

As illustrated in FIG. 9, the transporting accuracy measurement image Gm includes a first transporting accuracy measurement image Gm1 printed in a region along one side of sides along a transporting direction of the printing medium, and a second transporting accuracy measurement image Gm2 printed in a region along the other side of the sides along the transporting direction. In addition, the first transporting accuracy measurement image Gm1 and the second transporting accuracy measurement image Gm2 each includes a start point image Gms indicating a start point of the transporting accuracy measurement image Gm in the transporting direction, and an end point image Gme indicating an end point of the transporting accuracy measurement image Gm in the transporting direction.

In the measurement image printing process according to the present embodiment, as the transporting accuracy measurement image Gm, printing the first transporting accuracy measurement image Gm1 and printing the second transport precision measurement image Gm 2.

Figure 10:
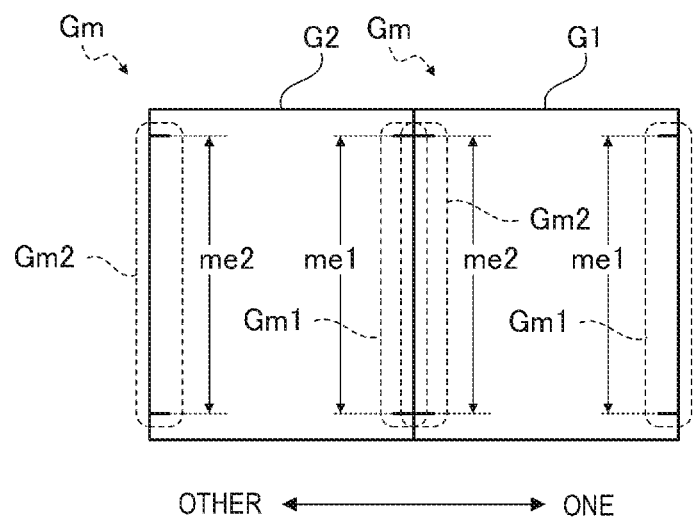
FIG. 10 is an explanatory diagram illustrating a basic concept of a printing method according to Embodiment 2.

FIG. 10 is an explanatory diagram illustrating a basic concept of a printing method according to the present embodiment. As illustrated in FIG. 10, one of the print images printed based on the divided image data Dn and adjacent to each other in a direction intersecting the transporting direction is defined as a first print image G1, and the other of the print images is defined as a second print image G2. In addition, the divided image data Dn based on the first print image G1 is defined as a first divided image data D1, the divided image data Dn based on the second print image G2 is defined as a second divided image data D2, and the printing apparatus 100 to which the first divided image data D1 is assigned is defined as a first printing apparatus 1001, the printing apparatus 100 to which the second divided image data D2 is assigned is defined as a second printing apparatus 1002.

In FIG. 10, although a first transporting accuracy measurement image Gm1 and a second transporting accuracy measurement image Gm2 are indicated in each of the first print image G1 and the second print image G2, it does not indicate that each of the first print image G1 and the second print image G2 includes the first transporting accuracy measurement image Gm1 and the second transporting accuracy measurement image Gm2, but indicates that the measurement value me1 and the measurement value me2 corresponding to the first printing apparatus 1001 that prints the first print image G1 and the second printing apparatus 1002 that prints the second print image G2, respectively.

As illustrated in FIG. 10, when a side shared by the first print image G1 and the second print image G2 is the other side of the first print image G1 and the one side of the second print image G2, in the correcting step, based on a measurement value me2 of a length of the second transporting accuracy measurement image Gm2 printed by the first printing apparatus 1001 and a measurement value me1 of a length of the first transporting accuracy measurement image Gm1 printed by the second printing apparatus 1002, correcting a length of at least one divided image data Dn of the first divided image data D1 and the second divided image data D2 in a direction along the transporting direction.

A specific example of the present embodiment will be described below.

2.1. EXAMPLE 3

Figure 11:
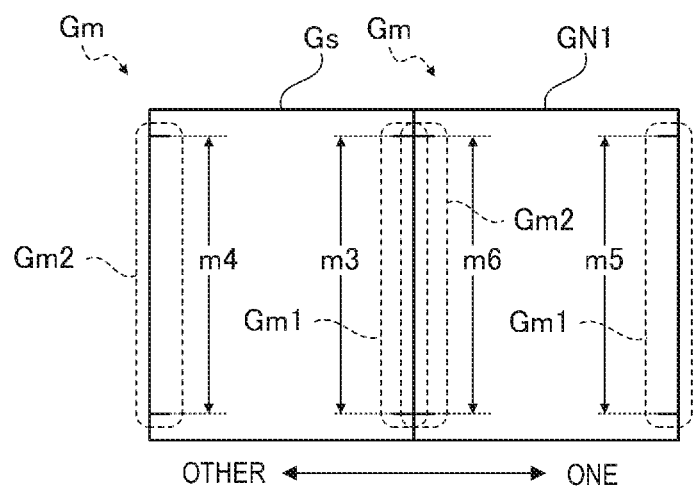
FIG. 11 is an explanatory diagram illustrating a case in which a first adjacent print image is adjacent to one side of a reference print image in Example 3.
Figure 12:
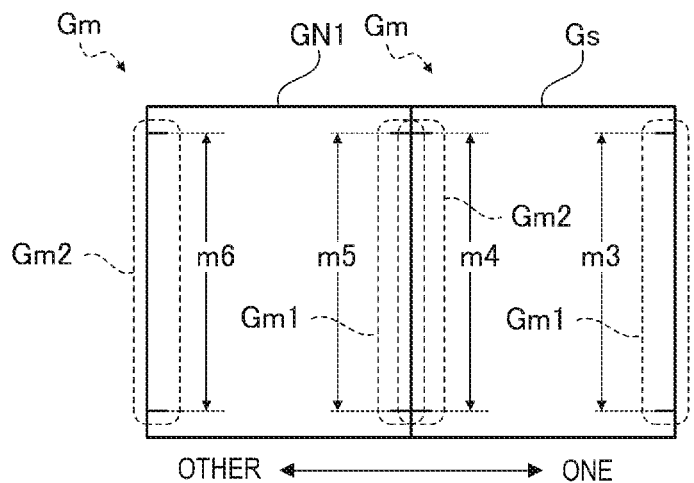
FIG. 12 is an explanatory diagram illustrating a case in which the first adjacent print image is adjacent to the other side of the reference print image in Example 3.

FIG. 11 and FIG. 12 are explanatory diagrams of Example 3 as an example in Embodiment 2.

The printing method according to Example 3 includes a reference image selecting step, in which before the correcting step a reference image data Ds as a reference of dimension correction is selected from the plurality of divided image data Dn divided. Here, the printing apparatus 100 to which the reference image data Ds is assigned is defined as a reference printing apparatus 100s, and based on the reference image data Ds, the print image printed by the reference printing apparatus 100s is defined as the reference print image Gs.

In addition, a print image adjacent to the reference print image Gs in a direction intersecting the transporting direction is defined as a first adjacent print image GN1, and the divided image data DN based on the first adjacent print image GN1 is defined as a first adjacent divided image data DN1, and the printing apparatus 100 to which the first adjacent divided image data DN1 is assigned is defined as a first adjacent printing apparatus 100N1.

A measurement value of a length in the transporting direction of the first transporting accuracy measurement image Gm1 printed by the reference printing apparatus 100s is defined as a third measurement value m3, and a measurement value of a length in the transporting direction of the second transporting accuracy measurement image Gm2 printed by the reference printing apparatus 100s is defined as a fourth measurement value m4, and a measurement value of a length in the transporting direction of the first transporting accuracy measurement image Gm1 printed by the first adjacent printing apparatus 100N1 is defined as a fifth measurement value m5, and a measurement value of a length in the transporting direction of the second transporting accuracy measurement image Gm2 printed by the first adjacent printing apparatus 100N1 is defined as a sixth measurement value m6.

In the accuracy information obtaining step of Example 3, the third measurement value m3, the fourth measurement value m4, the fifth measurement value m5, and the sixth measurement value m6 are acquired as the print dimension accuracy information Sn.

FIG. 11 illustrates a case in which a first adjacent print image GN1 is adjacent to one side of a reference print image Gs, and FIG. 12 illustrates a case in which the first adjacent print image GN1 is adjacent to the other side of the reference print image Gs.

Note that in FIG. 11 and FIG. 12, although the first transporting accuracy measurement image Gm1 and the second transporting accuracy measurement image Gm2 are indicated in each of the reference print image Gs and the first adjacent print image GN1, it is does not indicate that each of the reference print image Gs and the first adjacent print image GN1 includes the first transporting accuracy measurement image Gm1 and the second transporting accuracy measurement image Gm2, but indicates that the third measurement value m3 and the fourth measurement value m4 are corresponding to the reference printing apparatus 100s that prints the reference print image Gs, and the fifth measurement value m5 and the sixth measurement value m6 are corresponding to the first adjacent printing apparatus 100N1 that prints the first adjacent print image GN1.

In the present example, as illustrated in FIG. 11, when a side shared by the reference print image Gs and the first adjacent print image GN1 is one side of the reference print image Gs and is the other side of the first adjacent print image GN1, in the correcting step, correcting the first adjacent divided image data DN1 to be (the third measurement value m3/the sixth measurement value m6) times in a direction along the transporting direction.

In addition, as illustrated in FIG. 12, when a side shared by the reference print image Gs and the first adjacent print image GN1 is other side of the reference print image Gs and is the one side of the first adjacent print image GN1, in the correcting step, correcting the first adjacent divided image data DN1 to be (the fourth measurement value m4/the fifth measurement value m5) times in a direction along the transporting direction.

2.2. EXAMPLE 4

Figure 13:
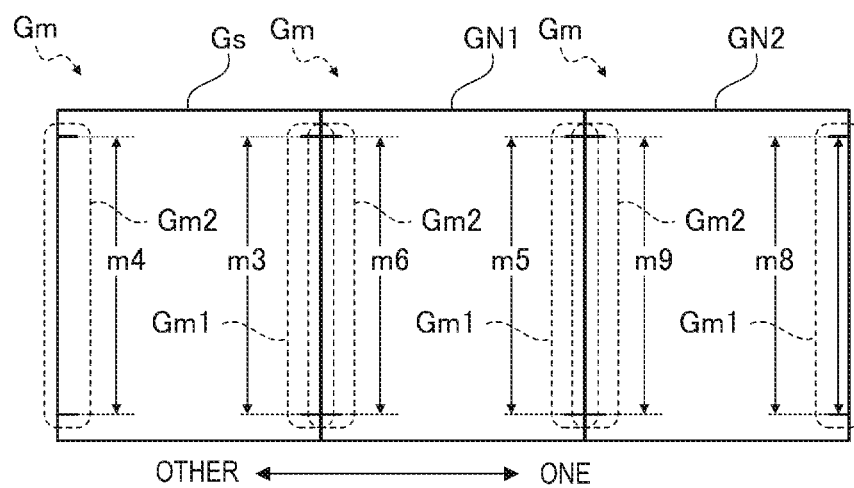
FIG. 13 is an explanatory diagram illustrating a case in which the first adjacent print image is adjacent to the other side of the reference print image and the second adjacent print image is adjacent to the other side of the first adjacent print image in Example 4.
Figures 14, 15:
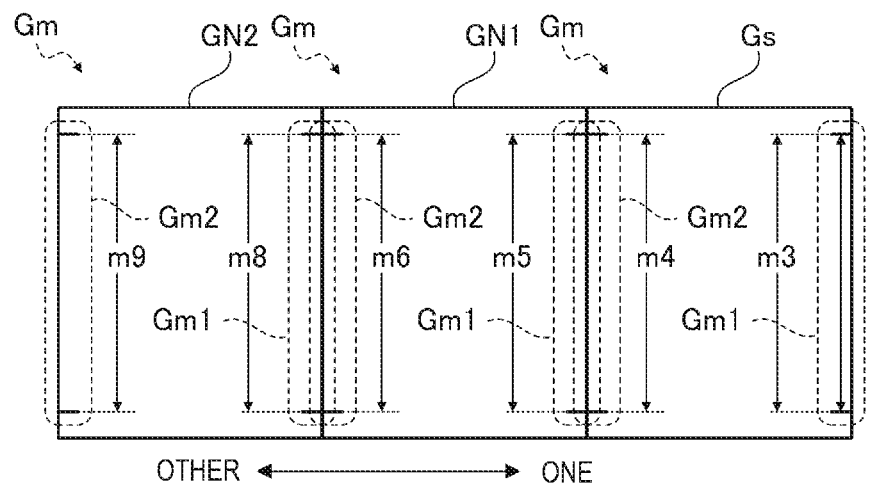
FIG. 14 is an explanatory diagram illustrating a case in which the first adjacent print image is adjacent to the other side of the reference print image and the second adjacent print image is adjacent to the other side of the first adjacent print image in Example 4.
FIG. 15 is a conceptual diagram illustrating an example of the print image divided into a matrix.

FIG. 13 and FIG. 14 are explanatory diagrams of Example 4 as a second example in Embodiment 2.

Example 4 illustrates a correcting method when there is a print image adjacent to the first adjacent print image GN1 so as to sandwich the first adjacent print image GN1 with the reference print image Gs in a direction intersecting the transporting direction.

Here, in a direction intersecting the transporting direction, a print image adjacent to the first adjacent print image GN1 so as to sandwich the first adjacent print image GN1 with the reference print image Gs is defined as a second adjacent print image GN2, and the divided image data DN based on the second adjacent print image GN2 is defined as a second adjacent divided image data DN2, and the printing apparatus 100 to which the second adjacent divided image data DN2 is assigned is defined as a second adjacent printing apparatus 100N2.

In addition, a measurement value of a length in the transporting direction of the first transporting accuracy measurement image Gm1 printed by the second adjacent printing apparatus 100N2 is defined as an eighth measurement value m8, and a measurement value of a length in the transporting direction of the second transporting accuracy measurement image Gm2 printed by the second adjacent printing apparatus 100N2 is defined as a ninth measurement value m9.

FIG. 13 illustrates a case in which the first adjacent print image GN1 is adjacent to one side of the reference print image Gs and a second adjacent print image GN2 is adjacent to one side of the first adjacent print image GN1. FIG. 14 illustrates a case in which the first adjacent print image GN1 is adjacent to the other side of the reference print image Gs and the second adjacent print image GN2 is adjacent to the other side of the first adjacent print image GN1.

Note that in FIG. 13 and FIG. 14, although the transporting accuracy measurement image Gm is indicated in each of the reference print image Gsm the first adjacent print image GN1 and the second adjacent print image GN2, it is does not indicate that each of the reference print image Gs, the first adjacent print image GN1 and the second adjacent print image GN2 includes the transporting accuracy measurement image Gm, but indicates that the third measurement value m3 and the fourth measurement value m4 are corresponding to the reference printing apparatus 100s that prints the reference print image Gs, and the fifth measurement value m5 and the sixth measurement value m6 are corresponding to the first adjacent printing apparatus 100N1 that prints the first adjacent print image GN1, and the eighth measurement value m8 and the ninth measurement value m9 are corresponding to the second printing apparatus 100N2 that prints the second adjacent print image GN2.

As illustrated in FIG. 13, when a side shared by the reference print image Gs and the first adjacent print image GN1 is one side of the reference print image Gs and is other side of the first adjacent print image GN1, and when a side shared by the first adjacent print image GN1 and the second adjacent print image GN2 is one side of the first adjacent print image GN1 and is other side of the second adjacent print image GN2, in the correcting step, correcting the first adjacent divided image data DN1 to be (the third measurement value m3/the sixth measurement value m6) times in a direction along the transporting direction, and correcting the second adjacent divide image data DN2 to be (the third measurement value m3/the sixth measurement value m6) (the fifth measurement value m5/the ninth measurement value m9) times in a direction along the transporting direction.

As illustrated in FIG. 14, when a side shared by the reference print image Gs and the first adjacent print image GN1 is other side of the reference print image Gs and is one side of the first adjacent print image GN1, and when a side shared by the first adjacent print image GN1 and the second adjacent print image GN2 is other side of the first adjacent print image GN1 and is one side of the second adjacent print image GN2, in the correcting step, correcting the first adjacent divided image data DN1 to be (the fourth measurement value m4/the fifth measurement value m5) times in a direction along the transporting direction, and correcting the second adjacent divide image data DN2 to be (the fourth measurement value m4/the fifth measurement value m5)* (the sixth measurement value m6/the eighth measurement value m8) times in a direction along the transporting direction.

According to the present embodiments, the following advantages can be obtained.

In the measuring image printing step, as the transporting accuracy measurement image Gm, the first transport accuracy measurement image Gm1 is printed in a region along one side of the sides along the transporting direction of the printing medium, and the second transporting accuracy measurement image Gm2 is printed on other side, and in the transporting accuracy measurement image Gm printed by the printing apparatus 100 for printing adjacent print images, based on a measurement value of each length in the transporting direction of transporting accuracy measurement image Gm corresponding to the shared side, dimension correction is performed to the divided image data Dn corresponding to each printing apparatus 100. Specifically, the divided image data Dn corresponding to the printing apparatus 100 for printing each print image is performed dimension correction, based on a measurement value of a second transporting accuracy measurement image Gm2 of one print image and a first transporting accuracy measurement image Gm1 of the other print image, the print image is printed at a position corresponding to the side shared by each the print image when joining the divided print image. For example, there is a difference in the amount of transport and the speed of transport on the two sides along the transporting direction of the printing medium, even when a difference occurs between the measurement value of the first transporting accuracy measurement image Gm1 and the measurement value of the second transporting accuracy measurement image Gm2, in the correcting step, since the correction is performed based on the measurement value of the length of each transporting accuracy measurement image Gm, the occurrence of shift of the joint in adjacent print images is suppressed.

Further, according to the printing method of Example 3 of the present embodiment, the divided image data Dn corresponding to the printing apparatus 100 for printing each print image is performed dimension correction, based on a measurement value of a first transporting accuracy measurement image Gm1 of one print image and a second transporting accuracy measurement image Gm2 of other print image, the print image is printed at a position corresponding to the side shared by each print image of the reference print image Gs and the first adjacent print image GN1 when joining the divided print image. Since the correction is performed with the magnification based on the ratio of the measurement values of the lengths of the respective transporting accuracy measurement images Gm, the occurrence of the shift at the joint between the print images adjacent to the reference print image Gs is suppressed.

In addition, according to the printing method of Example 4 of the present embodiment, in the correcting step, the dimension of the print image that is continuously adjacent to a print image is corrected with reference to the print image based on the reference image data Ds, and the occurrence of shift of the joint in adjacent print images is suppressed. Further, in this correction, the divided image data Dn corresponding to the printing apparatus 100 for printing each print image is performed dimension correction, based on a measurement value of a first transporting accuracy measurement image Gm1 of one print image and a second transporting accuracy measurement image Gm2 of the other print image, the print image is printed at a position corresponding to the side shared by the print image for joining the divided print image. For example, there is a difference in the amount of transport and the speed of transport on the two sides along the transporting direction of the printing medium, even when a difference occurs between the measurement value of the first transporting accuracy measurement image Gm1 and the measurement value of the second transporting accuracy measurement image Gm2, since the correction by the magnification based on the measurement value of the length of each transporting accuracy measurement image Gm is performed, the occurrence of shift of the joint in adjacent print images is suppressed.

3. Embodiment 3

In the present embodiment, an example focusing on the case where the original image data D0 is divided into a plurality of divided image data Dn in a matrix will be described.

Note that the same configuration as in the embodiment 1 and the embodiment 2 are referenced using like numbers, and no detailed descriptions for such configurations are provided below.

3.1. EXAMPLE 5

FIG. 15 is a conceptual diagram illustrating an example of the print image divided into a matrix.

For example, when k, m is an integer greater than or equal to 2, and the column direction is a direction intersecting the transporting direction and the row direction, In the image dividing step, the original image data D0 can be divided into divided image data Dn of k rows and m columns.

Specifically, the values of k and m are determined from the size of the large print image created by joining the divided print images and the size of the print image that can be printed by each printing apparatus 100.

In the image dividing step, the original image data D0 is divided into divided image data Dn of k rows and m columns based on the determined k and m.

Further, in the reference image selecting step, the reference image data Ds can be selected for each divided image data Dn of each divided line.

The selecting is that, for example, displaying a print image divided into a matrix shown in FIG. 15 on the display unit 113, and designating the reference print image Gs one by one for each print image of each row according to an input instruction from the input unit 112. By designating the reference print image Gs, the corresponding reference image data Ds is selected.

The example illustrated in FIG. 15 illustrates a case in which, for example, a print image diagonally close to the top left to the bottom right when FIG. 15 is viewed from the front is selected as the reference print image Gs, and specifically, the case in which the reference print image Gs1 to the reference print image Gsm are selected is shown.

With respect to the reference image data Ds specified in each row, the length of a direction along the transporting direction of the first adjacent divided image data DN1 corresponding to the first adjacent print image GN1 adjacent to the reference print image Gs and the length of a direction along the transporting direction of the second adjacent divided image data DN2 corresponding to the second adjacent print image GN2 adjacent to the first adjacent print image GN1 are corrected by any of the methods of the embodiments described above.

In FIG. 15, the first adjacent print image GN1 is indicated by GN11 to GN1m, and the second adjacent print image GN2 is indicated by GN21 to GN2m.

According to the present embodiment, even when the original image data D0 is divided into a plurality of divided image data Dn in a matrix, since the reference image data Ds as a reference for the dimension correction for each image data in each row over a plurality of rows can be selected, with reference to the reference image data Ds set in each row over a plurality of rows, the occurrence of shift of the joint in adjacent print images is suppressed.

3.2. EXAMPLE 6

As illustrated in Example 5, the printing method according to the present example provides a correcting method that does not generate gaps between rows that are compromised when the divided image data Dn corresponding to the print image that is adjacent to the reference printing image Gs is independently corrected on each row.

Figure 16:
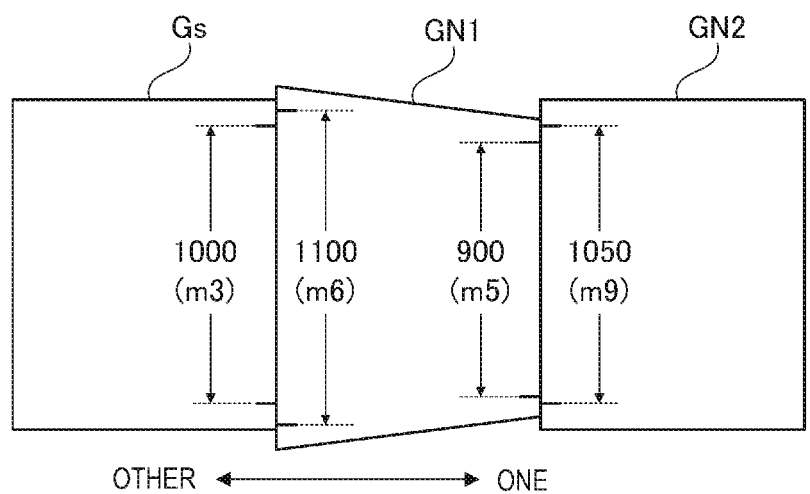
FIG. 16 is a conceptual diagram illustrating an example when a gap is generated between the print images by correction.
Figure 17:
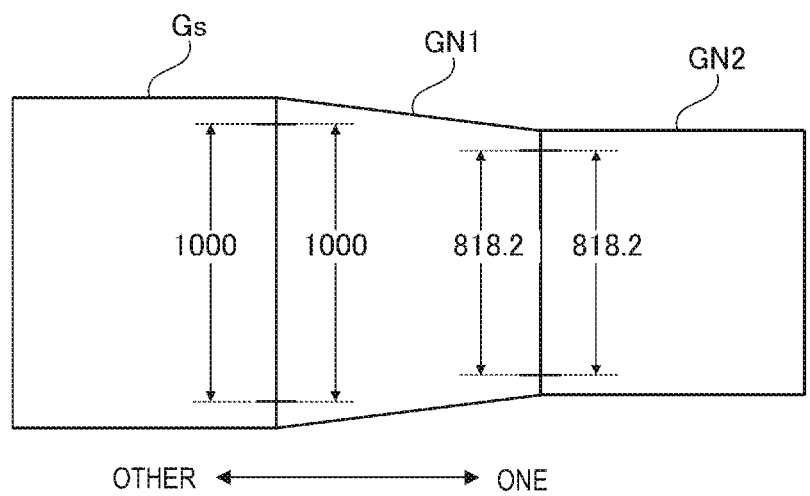
FIG. 17 is a conceptual diagram illustrating an example when a gap is generated between the print images by correction.

FIG. 16 and FIG. 17 are conceptual diagrams illustrating an example when a gap is generated between the print images by correction.

FIG. 16 illustrates a case in which, for example, in the case of Example 4 described with reference to FIG. 13, the respective measured values are so that the third measured value m3 is 1000 mm, the sixth measured value m6 is 1100 mm, the fifth measured value m5 is 900 mm, the ninth measurement value m9 is 1050 mm.

In this case, in the correcting step of Example 4, the first adjacent divided image data DN1 is corrected to be (the third measurement value m3/the sixth measurement value m6)* (1000 mm/1100 mm) times in a direction along the transporting direction, and the second adjacent divided image data DN2 is corrected to be (the third measurement value m3/the sixth measurement value m6)*(the fifth measurement value m5/the ninth measurement value m9) that is (1000 mm/1100 mm)*(900 mm/1050 mm) times in a direction along the transporting direction.

FIG. 17 illustrates a print image of the correction result.

As a result of the correction, for example, when the first adjacent divided image data DN1 and the second adjacent divided image data DN2 are image data for printing the first transporting accuracy measurement image Gm1 and the second transporting accuracy measurement image Gm2, the length of the second transporting accuracy measurement image Gm2 on the other side of the first adjacent print image GN1 in the transporting direction is 1100 mm*(1000 mm/1100 mm), that is 1000 mm, and the length of the first transporting accuracy image Gm1 on one side is 900 mm* (1000 mm/1100 mm), that is about 818.2 mm. The length of the second conveyance accuracy measurement image Gm2 on the other side of the second adjacent print image GN 2 in the conveyance direction is 1050*(1000 mm/1100 mm)* (900 mm/1050 mm), that is about 818.2 mm.

As described above, In the case of the printing method of the fourth embodiment, when the original image data D0 is divided into a plurality of divided image data Dn in a matrix form, the length of the print image in the conveyance direction may be different, and as a result, a gap is generated between print images between rows.

Figure 18:
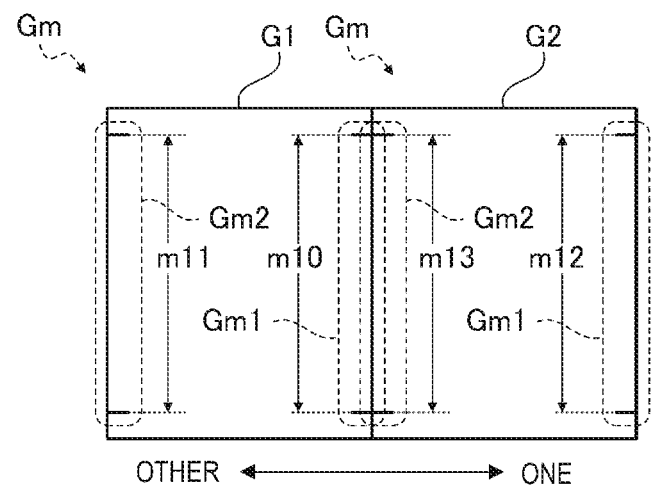
FIG. 18 is an explanatory diagram illustrating a case in which a second adjacent print image is adjacent to one side of a first adjacent print image in Example 6.
Figure 19:
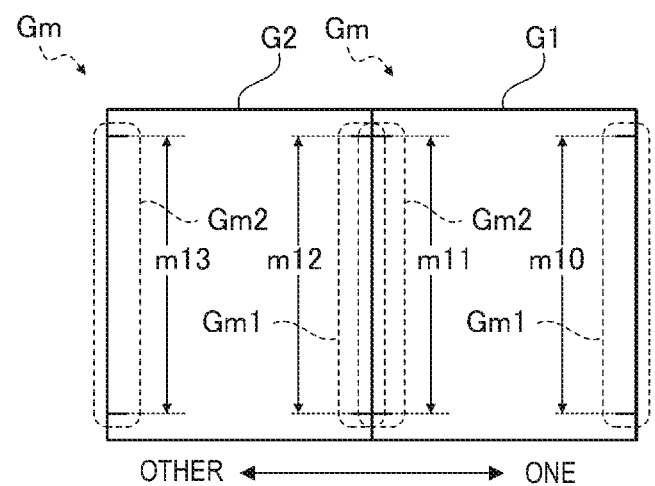
FIG. 19 is an explanatory diagram illustrating a case in which the second adjacent print image is adjacent to the other side of the first adjacent print image in Example 6.

FIG. 18 and FIG. 19 are explanatory diagrams of Example 6.

In the printing method according to the example, first, in the measuring image printing step, as the transporting accuracy measurement image Gm, printing the first transporting accuracy measurement image Gm1 in a region along one side of the sides along the transporting direction of the print medium and printing the second transporting accuracy measurement image Gm2 in a region along another side of the sides along the transporting direction of the print medium.

Here, one of the print images printed based on the divided image data Dn and adjacent to each other in a direction intersecting the transporting direction is defined as a first print image G1, and the other of the print images is defined as a second print image G2.

In addition, the divided image data Dn based on the first print image G1 is defined as the first divided image data D1 and the second divided image data Dn based on the second divided image data G2 is defined as the first divided image data D2.

the printing apparatus 100 to which the first divided image data D1 is assigned is defined as a first printing apparatus 1001, the printing apparatus 100 to which the second divided image data D2 is assigned is defined as a second printing apparatus 1002. Further, a measurement value of a length in the transporting direction of the first transporting accuracy measurement image Gm1 printed by the first printing apparatus 1001 is defined as a tenth measurement value m10, and a measurement value of a length in the transporting direction of the second transporting accuracy measurement image Gm2 printed by the first printing apparatus 1001 is defined as an eleventh measurement value m11, and a measurement value of a length in the transporting direction of the first transporting accuracy measurement image Gm1 printed by the second adjacent printing apparatus 1002 is defined as a twelfth measurement value m12, and a measurement value of a length in the transporting direction of the second transporting accuracy measurement image Gm2 printed by the second adjacent printing apparatus 1002 is defined as a thirteenth measurement value m13.

FIG. 18 illustrates a case in which a second print image G2 is adjacent to one side of a first print image G1, and FIG. 19 illustrates a case in which the second print image G2 is adjacent to other side of the first print image G1.

Note that in FIG. 18 and FIG. 19, although a first print image G1 and a second print image G2 are indicated in each of the transporting accuracy measurement image Gm, it does not indicate that each of transporting accuracy measurement image Gm includes the first print image G1 and the second print image G2, but indicates that the tenth measurement value m10 and the eleventh measurement value m11 are corresponding to the first printing apparatus 1001 for printing the first print image G1 and the thirteenth measurement value m13 are corresponding to the second printing apparatus 1002 for printing the second print image G2.

In the present example, as illustrated in FIG. 18, when a side shared by the first print image G1 and the second print image G2 is one side of the first print image G1 and is other side of the second print image G2, in the correcting step, correcting the second divided image data D2 so that: in a direction along the transporting direction, correcting a length of the one side of the second divided image data to be (the tenth measurement value m10/the twelfth measurement value m12) times, and correcting a length of the other side to be (the tenth measurement value m10/the thirteenth measurement value m13) times, and correcting a length in a range from the one side to the other side to be a multiple times that the multiple is obtained by proportionally distributing the multiple for correcting the length of the one side and the multiple for correcting the length of the other side.

Here, a multiple for correcting the length of one side is set to be A, the multiple for correcting the length of the other side is set to be B, the length from the other side to one side of the direction intersecting the transporting direction is set to be C, the distance from the other side of the position to which the multiple obtained by proportional division is applied in the direction intersecting the transport direction is set to be D, specifically, it is a multiple obtained by the following formula.

Multiple=$B+(A-B) \times D/C$

As illustrated in FIG. 19, when a side shared by the first print image G1 and the second print image G2 is other side of the first print image G1 and is one side of the second print image G2, in the correcting step, correcting the second divided image data D2 so that: in a direction along the transporting direction, correcting a length of the one side of the second divided image data to be (the eleventh measurement value m11/the twelfth measurement value m12) times, and correcting a length of the other side to be (the eleventh measurement value m11/the thirteenth measurement value m13) times, and correcting a length in a range from the one side to the other side to be a multiple times that the multiple is obtained by proportionally distributing the multiple for correcting the length of the one side and the multiple for correcting the length of the other side.

For example, when the first print image G1 in FIG. 18 is the reference print image Gs illustrated in FIG. 16, and the second print image G2 in FIG. 18 is the first adjacent print image GN1 illustrated in FIG. 16, that is, when the tenth measurement value m10 is 1000 mm, the thirteenth measurement value m13 is 1100 mm, and the twelfth measurement value m12 is 900 mm, as a result of the correction, for example, when the first divided image data D1 and the second divided image data D2 are the image data for printing the first transporting accuracy measurement image Gm1 and the second transporting accuracy measuring image Gm2, the length in the transporting direction of the second transporting accuracy measurement image Gm2 on the side of the other side of the second printing image G2 is 1100 mm* (1000 mm/1100 mm), that is 1000 mm, and the length of one side of the first transporting accuracy measurement image Gm1 is 900 mm*(1000 mm/900 mm)=1000 mm, that is, corrected to the same length. In addition, the print image in the range from one side to the other side is corrected by a multiple that is proportional to the multiple of the correction on both sides.

That is, according to Example 6, in FIG. 18, the length of the second print image G2 in the transport direction can be corrected to match the length of the side shared with the adjacent first print image G1. In addition, in the second printed image G2 to be printed in the second printing apparatus 1002, when the length of one side and the other side is different, specifically, even when the transporting speed is inclined in the direction intersecting the transporting direction, that is, in the width direction of the printing medium, the length of the range from one side to the other side is multiplied by a factor that is multiplied by a multiple that corrects the length of one side and a multiple that corrects the length of the other side, thus, the length of the second print image G2 in the width direction can be adjusted to the length of the side that shares the length in the conveyance direction with the adjacent first print image G1. As a result, even when the original image data D0 is divided into a plurality of pieces of divided image data Dn in a matrix form, the print images can be connected without any gap or shift.

Modification examples of the embodiment described above will be described below. Moreover, the same constituent elements as the constituent elements in Exemplary Embodiment 1 are denoted by the same reference signs, and descriptions of such constituent elements will be omitted.

4. Modification Example

4.1. MODIFICATION EXAMPLE 1

In Exemplary Embodiment 1, in the assignment step, although the algorithm for assigning each of the divided image data Dn to any one of the printing apparatuses 100 is not particularly defined, the allocation according to the characteristics of the printing apparatus 100 can be optimized.

The printing method according to the present modification example is that, in the assigning step, the printing apparatus 100 is assigned such that the dimension correction amount of the divided image data Dn is reduced based on the printing dimension accuracy information Sn of each of the printing apparatuses 100.

Details will be described below.

The printing method according to the present modification example includes a reference image selecting step for selecting a reference image data Ds as a reference of dimension correction from the plurality of divided image data Dn divided.

In addition, a printing apparatus 100 to which the reference image data Ds is assigned is defined as the reference printing apparatus 100s, a print image printed by the reference printing apparatus 100s based on the reference image data Ds is defined as a reference print image Gs, a print image adjacent to the reference print image Gs in a direction intersecting the transporting direction is defined as a first adjacent print image GN1, and the divided image data DN based on the first adjacent print image GN1 is defined as a first adjacent divided image data DN1, and the printing apparatus 100 to which the first adjacent divided image data DN1 is assigned is defined as a first adjacent printing apparatus 100N1.

In the assigning step in the present modification example, assigning the printing apparatuses 100, which is a combination having the smallest correction amount of dimension of the first adjacent divided image data DN1 based on the printing dimension accuracy information Sn of each of the printing apparatuses 100, to the reference printing apparatus 100s and the first adjacent printing apparatus 100N1.

Specifically, for example, selecting a combination of the reference printing apparatus 100s and the first adjacent printing apparatus 100N1 when a value of (the first measurement value m1/the second measurement value m2) that is a multiple to be corrected is a value closest to 1, and the multiple is the times that first adjacent divided image data DN 1 obtained in the correction step of Example 1 is corrected to be, in a direction along the transporting direction.

For example, in the case of Example 2, first, selecting a combination of the reference printing apparatus 100s and the first adjacent printing apparatus 100N1 when the multiple to be corrected with respect to the first adjacent divided image data DN1 are closest to 1, next, selecting the second adjacent printing apparatus 100N2 when the value is closest to 1 with respect to the second adjacent divided image data DN 2.

According to the present modified example, the correction amount of the adjacent print image with respect to the reference print image Gs is reduced, so the printed matter that is closer to the original image can be obtained in the peripheral print image including the reference print image Gs, and the convenience is increased for the user.

4.2. MODIFICATION EXAMPLE 2

Figure 20:
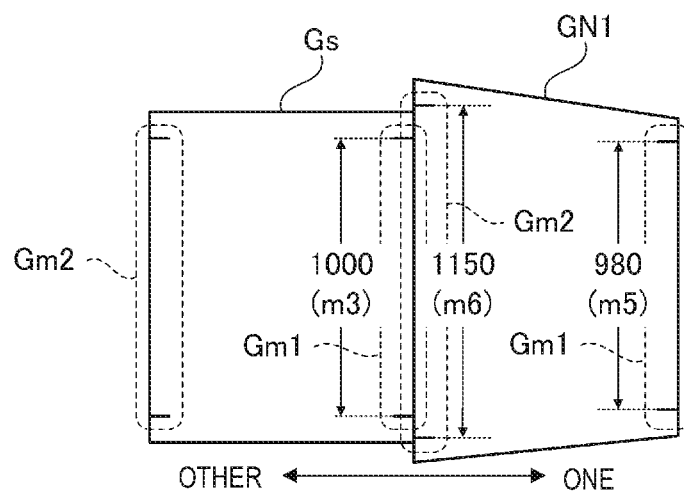
FIG. 20 is an explanatory diagram of Modification Example 2.

FIG. 20 is an explanatory diagram of Modification Example 2.

The printing method of the present modification is characterized in that the first adjacent divided image data DN1 is rotated so that the dimension correction amount of the first adjacent divided image data DN1 is reduced in the assigning step in the third embodiment. Here, the rotate refers to converting the first adjacent divided image data DN1 so that the image printed based on the image data obtained by rotating the first adjacent divided image data DN1 matches an image obtained by rotating the center of the first adjacent divided image data DN1 by 180 degrees around the center of the first adjacent print image GN1. The printing method according to the modification includes a reference image selecting step, in which before the correcting step a reference image data Ds as a reference of dimension correction is selected from the plurality of divided image data Dn divided.

Further, in the measuring image printing step, as the transporting accuracy measurement image Gm, printing the first transporting accuracy measurement image Gm1 in a region along one side of the sides along the transporting direction of the print medium and printing the second transporting accuracy measurement image Gm2 in a region along another side of the sides along the transporting direction of the print medium.

Here, a printing apparatus 100 to which the reference image data Ds is assigned is defined as the reference printing apparatus 100s, a print image printed by the reference printing apparatus 100s based on the reference image data Ds is defined as a reference print image Gs, a print image adjacent to the reference print image Gs in a direction intersecting the transporting direction is defined as a first adjacent print image GN1, and the divided image data DN based on the first adjacent print image GN1 is defined as a first adjacent divided image data DN1, and the printing apparatus 100 to which the first adjacent divided image data DN1 is assigned is defined as a first adjacent printing apparatus 100N1.

In addition, a measurement value of a length in the transporting direction of the first transporting accuracy measurement image Gm1 printed by the reference printing apparatus 100s is defined as a third measurement value m3, and a measurement value of a length in the transporting direction of the first transporting accuracy measurement image Gm1 printed by the first adjacent printing apparatus 100N1 is defined as a fifth measurement value m5, and a measurement value of a length in the transporting direction of the second transporting accuracy measurement image Gm2 printed by the first adjacent printing apparatus 100N1 is defined as a sixth measurement value m6.

At this time, when (the third measurement value m3−the sixth measurement value m6)$^2$>(the third measurement value m3−the fifth measurement value m5)$^2$, in the correcting step, converting the first adjacent divided image data DN1 so that the first adjacent print image GN1 rotates 180 degrees in plan view, and correcting the first adjacent divided image data DN1 to be (the third measurement value m3/the fifth measurement value m5) times in a direction along the transporting direction.

For example, as illustrated in FIG. 20, when each measurement value is that a third measurement value m3 is 1000 mm, a sixth measurement value m6 is 1150 mm, and a fifth measurement value m5 is 980 mm, (the third measurement value m3−the sixth measurement value m6)$^2$ is 22500 mm, which is bigger than (the third measurement value m3−the fifth measurement value m5)$^2$ which is 400 mm$^2$, thus, to the correction step, the first adjacent divided image data DN 1 is converted so that the first adjacent print image GN1 rotates 180 degrees in plan view, and the converted first adjacent divided image data DN1 is corrected to be (the third measurement value m3/the fifth measurement value m5), this is about 1.02, times in a direction along the conveyance direction. As in Example 3, compared to the case where the first adjacent printed image GN 1 is corrected to (the third measurement value m3/the sixth measurement value m6), that is about 0.87, times without rotating, the degree of correction can be reduced.

According to the present modified example, the correction amount of the adjacent print image with respect to the reference print image Gs is reduced, so the printed matter that is closer to the original image can be obtained in the peripheral print image including the reference print image Gs, and the convenience is increased for the user.

4.3. MODIFICATION EXAMPLE 3

Figure 21:
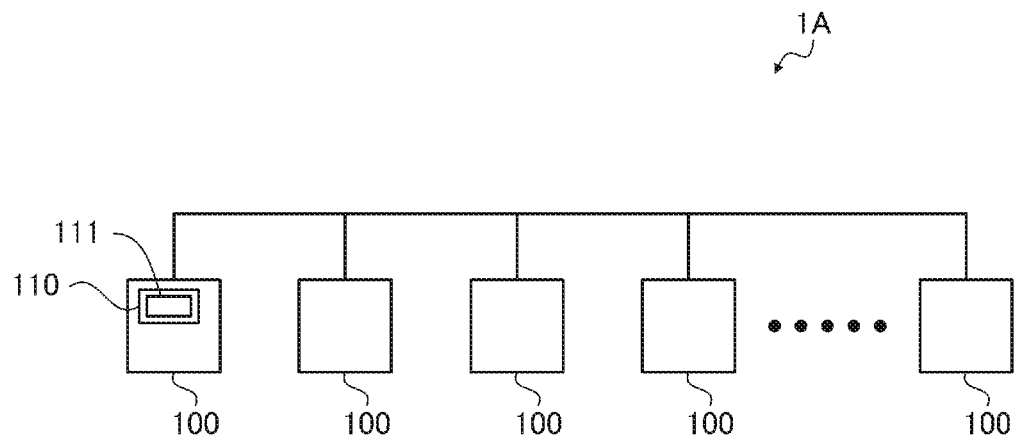
FIG. 21 is a block diagram illustrating a configuration of a printing system according to Modification Example 3.

FIG. 21 is a block diagram illustrating a configuration of a printing system according to Modification Example 3.

This Modification Example is a Modification Example of the configuration of the printing system 1.

The printing system 1A according to the modification example includes a plurality of printing apparatuses 100 and a controlling apparatus 110 included in any one of the plurality of the printing apparatuses 100 and configured to control the plurality of the printing apparatuses to perform poster printing by distributed printing 100.

In addition, the controlling apparatus 100 includes a storage unit 114 that stores print dimension accuracy information Sn of each of the plurality of the printing apparatuses 100, and a printing apparatus control unit 111 configured to divide original image data D0 to be printed into a plurality of divided image data Dn, and assign each of the divided image data Dn divided to two or more printing apparatuses 100 of the plurality of the printing apparatuses 100, and perform dimension correction on a part or all of the divided image data Dn corresponding to each of the printing apparatuses 100 based on the print dimensional accuracy information Sn of each of the assigned printing apparatus 100, and execute printing on the printing apparatus 100 to which the divided image data Dn is assigned based on the divided image data Dn in which the part or all of the divided image data Dn that was performed the dimension correction.

In such a configuration, in the printing apparatus 100 including the controlling apparatus 110, for example, it may be configured such that CPU32 included in the printing apparatus 100 joins the function of the CPU115 included in the controlling apparatus 110, or it may also be the opposite configuration. The memory 33 of the printing apparatus 100 may be configured to have the function of the memory 118 included in the controlling apparatus 110, or it may also be the opposite configuration.

In other words, for example, when each printing apparatus 100 includes a personal computer and constitutes a part of the printing control unit 30, the printing apparatus 100 may be provided with the hardware configuration and function of the controlling apparatus 110 as in the present modification example. Also in the present modification example, effects similar to the effects of the first exemplary embodiment described above can be achieved.

4.4. MODIFICATION EXAMPLE 4

Figure 22:
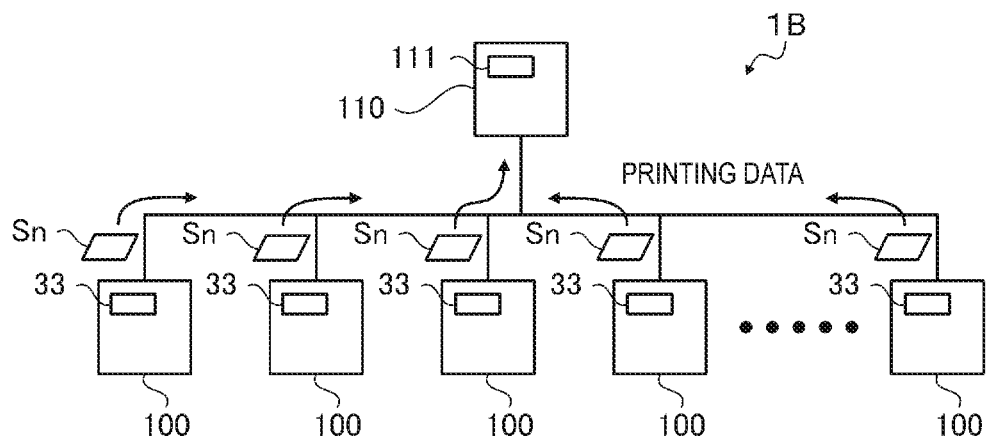
FIG. 22 is a block diagram illustrating a configuration of a printing system according to Modification Example 4.

FIG. 22 is a block diagram illustrating a configuration of a printing system according to Modification Example 4.

This Modification Example is a Modification Example of the configuration of the printing system 1.

The printing system 1B of the present modification example includes a plurality of printing apparatuses 100 and a controlling apparatus 110 configured to control the plurality of the printing apparatuses to perform poster printing by distributed printing 100.

Each of the printing apparatuses 100 of the plurality of printing apparatuses 100 includes a memory 33 as a storage unit that stores the printing dimension accuracy information Sn of the printing apparatuses 100.

The controlling apparatus 110 includes a printing apparatus control unit 111 configured to divide original image data D0 to be printed into a plurality of divided image data Dn, and assign each of the divided image data Dn divided to two or more printing apparatuses 100 of the plurality of the printing apparatuses 100, and acquire printing dimension accuracy information Sn from each of the printing apparatuses assigned with the divided image data 100, and perform dimension correction on a part or all of the divided image data Dn corresponding to each of the printing apparatuses 100 based on the print dimensional accuracy information Sn of each of the assigned printing apparatus 100, and execute printing on the printing apparatus 100 to which the divided image data Dn is assigned based on the divided image data Dn in which the part or all of the divided image data Dn that was performed the dimension correction.

In other words, the hardware configuration of the printing system 1B is the same as that of the first embodiment. In the first embodiment, printing dimension accuracy information Sn is input from an external information input device in advance and stored in the storage unit 114, In step S4, it is assumed that the data is read from the storage unit 114, but as in the present modification example, the printing apparatus 100 of each of the plurality of printing apparatuses 100 may be configured to store own printing dimension accuracy information Sn, and in step S4, the printing apparatus 100 may be configured to read the data from each printing apparatus 100.

Also in the present modification example, effects similar to the effects of the first exemplary embodiment described above can be achieved.

4.5. MODIFICATION EXAMPLE 5

Figure 23:
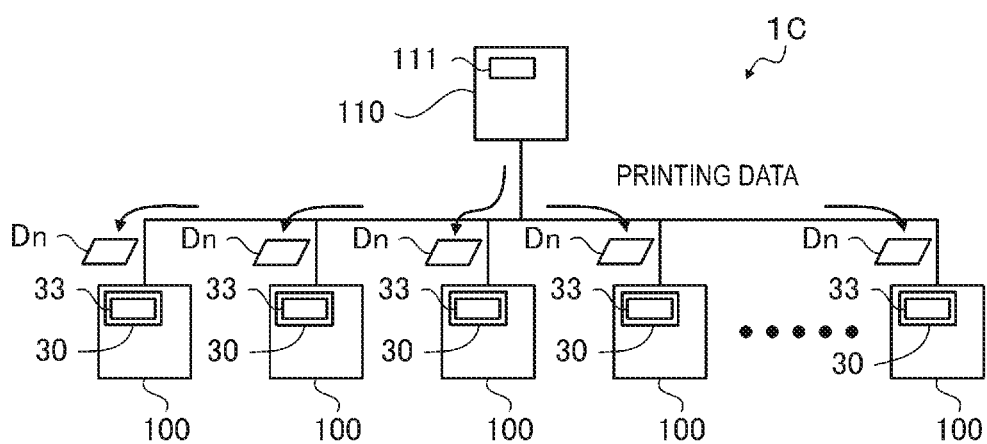
FIG. 23 is a block diagram illustrating a configuration of a printing system according to Modification Example 5.

FIG. 23 is a block diagram illustrating a configuration of a printing system according to Modification Example 5.

The printing method according to the present modification example differs from the first embodiment in the method of correcting the divided image data Dn. In Example 1, the reference image data Ds based on the dimension correction is selected from the plurality of divided image data Dn, and a print image to be printed based on the reference image data Ds is referred to as a reference print image Gs, and the first adjacent divided image data DN1 is corrected so that the length of the reference print image Gs along the transporting direction of the first adjacent print image GN1 which is the print image adjacent to the reference print image Gs in the direction intersecting the conveyance direction matches the length of the reference print image Gs, but in the fifth modification, the correction is performed without selecting the reference image data Ds. Specifically, the divided image data Dn is corrected so that the length of the print image printed by the printing apparatus 100 in the conveyance direction is the ideal length, and to the printing apparatus 100 the divided image data Dn is assigned so as to print the divided image data Dn on the basis of the length (ideal length) along the conveying direction of the image ideally printed as data.

The printing system 1C of the present modification example includes a plurality of printing apparatuses 100 and a controlling apparatus 110 configured to control the plurality of the printing apparatuses to perform poster printing by distributed printing 100.

The controlling apparatus 110 includes a printing apparatus control unit 111 configured to divide original image data D0 to the plurality of divided image data Dn to assign the divided image data Dn to two or more printing apparatuses 100 in the plurality of printing apparatuses 100 to perform printing. In addition, the printing apparatus 100 of each of the plurality of printing apparatuses 100 includes a memory 33 as a storage unit configured to store the print dimension accuracy information Sn of the printing apparatus 100 its own, a printing unit 10 configured to perform printing on the printing medium, a printing control unit 30 configured to perform dimension correction on the assigned divided image data Dn based on the printing dimension accuracy information Sn and execute the printing unit 10 to print based on the dimension corrected divided image data Dn.

Each of the printing apparatuses 100 stores, in the memory 33, the transporting accuracy information Cn as a measurement value of the transporting accuracy measurement image Gm having a reference length of 1000 mm printed by itself, for example, as the printing dimension accuracy information Sn of the printing apparatus 100 its own. The printing apparatus 100 to which the divided image data Dn is assigned performs the dimension correction of the divided image data Dn based on the transporting accuracy information Cn. For example, when the divided image data Dn is image data corresponding to the transporting accuracy measurement image Gm having a reference length of 1000 mm, the dimension correction is performed so that the transporting accuracy measurement image Gm is 1000 mm based on the transporting accuracy information Cn.

In this way, the dimension correction is performed so that each of the printing apparatuses 100 to which the divided image data Dn is assigned becomes an original size that it is supposed to be, thus, in poster printing, the occurrence of image shift in the print image of the joint is suppressed.

In addition, since each printing apparatus 100 corrects the size of the assigned divided image data Dn, the image processing for correction can be distributed.

4.6. MODIFICATION EXAMPLE 6

Figure 24:
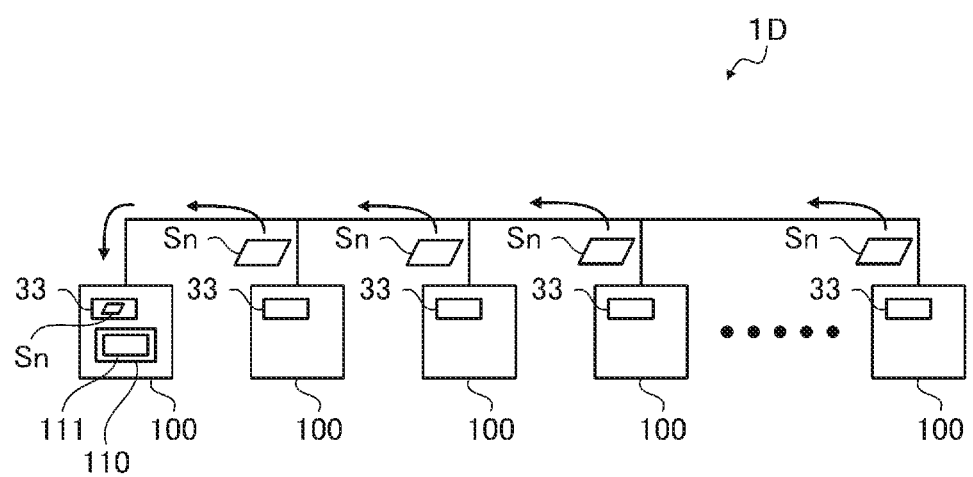
FIG. 24 is a block diagram illustrating a configuration of a printing system according to Modification Example 6.

FIG. 24 is a block diagram illustrating a configuration of a printing system according to Modification Example 6.

This Modification Example is a Modification Example of the configuration of the printing system 1.

The printing system 1D according to the modification example includes a plurality of printing apparatuses 100 and a controlling apparatus 110 included in any one of the plurality of the printing apparatuses 100 and configured to control the plurality of the printing apparatuses to perform poster printing by distributed printing 100.

Each of the printing apparatuses 100 of the plurality of printing apparatuses 100 includes a memory 33 as a storage unit that stores the printing dimension accuracy information Sn of the printing apparatuses 100.

In addition, the controlling apparatus 110 divides the original image data D0 of the print target into a plurality of divided image data Dn, assigns each divided image data Dn to two or more printing apparatuses 100 in the plurality of printing apparatuses 100, acquires printed dimensional precision information Sn from each assigned printing apparatus 100, and based on the acquired print dimension accuracy information Sn, Part or all of the divided image data Dn corresponding to each of the printing apparatuses 100 is dimensionally corrected, and a printing apparatus control unit 111 configured to perform printing on the printing apparatus 100 to which the divided image data Dn is assigned, based on the divided image data Dn to which a part or all of the divided image data Dn is dimensionally corrected.

In other words, the hardware configuration of the printing system 1D is the same as that of the Modification Example 3.

Also in the present modification example, effects similar to the effects of the first exemplary embodiment described above can be achieved.

4.7. MODIFICATION EXAMPLE 7

This modification example is a modification example in the correction step of embodiment 1.

As a method of correcting the divided image data Dn based on the print dimension accuracy information Sn, in the embodiment 1, it was described that the first adjacent divided image data Dn1 is corrected to be (the first measurement value m1/the second measurement value m2) times in the direction along the transporting direction in the correcting step, but, the method for correcting the first adjacent print image GN1 is not limited to this.

For example, there may be a method for correcting the print data generated based on the first adjacent divided image data DN1 without correcting the first adjacent divided image data DN1.

Specifically, as a command for controlling the printing apparatus 100 included in the print data, the transporting pitch control command for controlling the transporting pitch of the printing medium transported in the transporting direction by the transporting unit 50 may be included, and the value of the transporting pitch in the transporting pitch control command may be corrected. The transport unit 50 may be configured to be able to change the transport pitch steplessly or at very small intervals, and when the first adjacent print image GN1 based on the first adjacent divided image data DN1 is corrected to be (the first measurement value m1/the second measurement value m2) times, the transporting pitch is corrected to be (the first measurement value m1/the second measurement value m2) times, and the transporting amount when printing the first adjacent print image GN1 is corrected.

Alternatively, as a command for controlling the printing apparatus 100 included in the print data, the transporting speed control command for controlling the transporting speed of the printing medium transported in the transporting direction by the transporting unit 50 may be included, and the value of the transporting speed in the transporting speed control command may be corrected.

The transport unit 50 may be configured to be able to change the transport speed steplessly or at very small intervals, and when the first adjacent print image GN1 based on the first adjacent divided image data DN1 is corrected to be (the first measurement value m1/the second measurement value m2)times, the transporting speed is corrected to be (the first measurement value m1/the second measurement value m2) times, and the transporting amount when printing the first adjacent print image GN1 is corrected.

Further, the correction of the print data including a feed pitch control command and a conveyance speed control command may be performed by the printing apparatus control unit 111, or may be performed by the printing control unit 30 included in the printing apparatus 100.

In the printing control unit 30 included by the printing apparatus 100, when the correction of the print data is performed, the printing dimension accuracy information Sn of the print data is stored in advance in the memory 33, print data based on the first adjacent divided image data DN1 is received, and based on its own print dimension accuracy information Sn, the print data, that is, the transporting pitch of the transporting pitch control command included in the print data, or the transporting speed of the transporting speed control command is corrected.

In other words, The printing apparatus 100 according to the present modification example includes a printing unit 10 for printing on a printing medium, a memory 33 as a storage unit for storing the printing dimension accuracy information Sn of the printing unit 10, a printing control unit 30 that controls the printing unit 10, and a conveying unit 50 that conveys the printing medium, wherein the print dimension accuracy information Sn includes transporting accuracy information Cn when the transporting unit 50 transports the print medium in the transporting direction, and the printing control unit 30 corrects the transporting amount of the print medium transported by the transporting unit 50 based on the transporting accuracy information Cn.

The printing apparatus 100 includes a memory 33 as a storage unit that stores the printing dimension accuracy information Sn of the printing apparatus 100, wherein when printing is executed based on the divided image data Dn assigned in the printing system 1, the dimension of the print image can be corrected by correcting the transporting amount for transporting the print medium based on the print dimension accuracy information Sn. As a result, in poster printing, the occurrence of image shift in the print image of the joint is suppressed. In addition, in poster printing, when the printing control unit 30 included in the printing apparatus 100 corrects the print data based on the print dimension accuracy information Sn of the printing apparatus 100, it is possible to perform printing in which the occurrence of image shift in the print image of the joint is suppressed, without providing a new function to the printing system 1.

Note that in the above-described embodiments and modification examples, although the description has focused on the shift of the joint of the print image in the transporting direction of the printing medium, it can also be applied to shift of the joint in the scanning direction intersecting the transporting direction. In other words, the print dimension accuracy information is not limited to a case in which including transporting accuracy information of a printing medium transported in a transporting direction of the printing apparatus. For example, accuracy information of a movement amount in a scanning direction of a carriage on which the head unit 11 is mounted may be included, and may correct the length of the divided image data in the scanning direction based on the accuracy information of the movement amount in the scanning direction.

Contents derived from the Embodiments will be described below.

The printing method of the present application is a printing method for performing poster printing in a printing system comprising a plurality of printing apparatuses, the printing method including an image dividing step for dividing original image data to be printed into a plurality of divided image data, an assigning step for assigning each of the divided image data to two or more printing apparatuses among the plurality of the printing apparatuses, an accuracy information acquiring step for acquiring print dimension accuracy information of each of the printing apparatuses assigned with the divided image data, a correcting step for performing dimension correction on a part or all of the divided image data corresponding to the printing apparatus assigned with each of the divided image data based on the acquired print dimension accuracy information, and a printing step for performing printing by the printing apparatus assigned with the divided image data based on the divided image data that underwent the correcting step.

The printing method includes a correcting step for performing dimension correction on a part or all of the divided image data corresponding to each of the printing apparatuses based on the printing dimension accuracy information of each of the printing apparatuses to which a plurality of divided image data obtained by dividing the original image data are assigned Thus, by joining the plurality of printed matters printed, for example, in poster printing for completing a large printed matter such as an oversized poster, variation in the dimension of the print image caused by individual differences of the plurality of printing apparatuses is corrected. As a result, in poster printing, the occurrence of image shift in the print image of the joint is suppressed.

In the printing method described above, the printing dimension accuracy information may include transporting accuracy information of a printing medium transported in a transporting direction of the printing apparatus.

According to this printing method, the printing dimension accuracy information includes transporting accuracy information of a printing medium transported in a transporting direction of the printing apparatus. Therefore, in poster printing, variation in the dimension of the print image caused by the individual difference of the transporting accuracy of the plurality of printing apparatuses is corrected. As a result, in poster printing, the occurrence of image shift in the print image of the joint is suppressed.

The printing method described above may include a measurement image printing step for printing a transporting accuracy measurement image on the printing medium by each of the plurality of the printing apparatuses and a transporting accuracy measuring step for measuring a length in the transporting direction of the printed transporting accuracy measurement image, and deriving the transporting accuracy information based on the measured length.

According to this printing method, the printing method according to the present embodiment includes a measurement image printing step for printing a transporting accuracy measurement image on the printing medium by each of the plurality of the printing apparatuses and a transporting accuracy measuring step for measuring a length in the transporting direction of the printed transporting accuracy measurement image, and deriving the transporting accuracy information based on the measured length. In other words, in the correcting step, performing dimension correction on a part or all of the divided image data corresponding to each of the printing apparatuses based on the printing dimension accuracy information including the transporting accuracy information obtained as a result of measuring by each printing apparatus. As a result, variation in the dimension of the print image caused by the individual difference of the transporting accuracy of the plurality of printing apparatuses is corrected more effectively. As a result, in poster printing, the occurrence of image shift in the print image of the joint is suppressed more effectively.

The printing method described above may include a reference image selecting step for selecting reference image data as a reference of dimension correction from among the plurality of the divided image data divided, wherein when the printing apparatus assigned with the reference image data is defined as a reference printing apparatus, and a print image printed by the reference printing apparatus based on the reference image data is defined as a reference print image, and a print image adjacent to the reference print image in a direction intersecting the transporting direction is defined as a first adjacent print image, and the divided image data on which the first adjacent print image is based is defined as a first adjacent divided image data, and the printing apparatus assigned with the first adjacent divided image data is defined as a first adjacent printing apparatus, and a measurement value of a length in the transporting direction of the transporting accuracy measurement image printed by the reference printing apparatus is defined as a first measurement value, and a measurement value of a length in the transporting direction of the transporting accuracy measurement image printed by the first adjacent printing apparatus is defined as a second measurement value, in the correcting step, as a dimension correction based on the acquired printing dimension accuracy information, correcting the first adjacent divided image data to be (the first measurement value/the second measurement value) times in a direction along the transporting direction.

According to this method, including a reference image selecting step for selecting a reference image data as a reference of dimension correction from the plurality of divided image data divided. Further, in the correcting step, based on the first measurement value as the transporting accuracy information of the printing apparatus assigned with the reference image data and the second measurement value as the transporting accuracy information of the printing apparatus that prints the print image adjacent to the reference print image printed based on the reference image data, dimension correction of the corresponding divided image data is performed. Specifically, based on the first measurement value that is a measurement value of the length in the transporting direction of the transporting accuracy measurement image printed by the printing apparatus assigned with the reference image data and the second measurement value that is a measurement value of the length in the transporting direction of the transporting accuracy measurement image printed by the printing apparatus that prints a print image adjacent to the print image that is printed based on the reference image data, the divided image data adjacent to the reference image data is corrected to be (the first measurement value/the second measurement value) times. That is, the dimension of the adjacent print image is corrected with reference to the print image based on the reference image data. As a result, it is possible to specify the image that you want to suppress the shift of the print image of the joint, and the variation of dimension between the designated print images is corrected more effectively, the convenience for the user is improved.

In the printing method described above, in the measurement image printing step, as the transporting accuracy measurement image, printing a first transporting accuracy measurement image in a region along one side of sides along the transporting direction of the printing medium, and printing a second transporting accuracy measurement image in a region along another side of the sides along the transporting direction, when one of the print images printed based on the divided image data and adjacent to each other in a direction intersecting the transporting direction is defined as a first print image, and the other of the print images is defined as a second print image, and the divided image data on which the first print image is based is defined as a first divided image data, the divided image data on which the second print image is based is defined as a second divided image data, and the printing apparatus assigned with the first divided image data is defined as a first printing apparatus, the printing apparatus assigned with the second divided image data is defined as a second printing apparatus, and when a side shared by the first print image and the second print image is the other side of the first print image and the one side of the second print image, in the correcting step, based on a measurement value of a length of the second transporting accuracy measurement image printed by the first printing apparatus and a measurement value of a length of the first transporting accuracy measurement image printed by the second printing apparatus, correcting a length of at least one of the first divided image data and the second divided image data in a direction along the transporting direction.

According to this printing method, in the measuring image printing step, as the transporting accuracy measurement image, printing the first transporting accuracy measurement image in a region along one side of the print medium and printing the second transporting accuracy measurement image along another side of the print medium. Further, in the correcting step, in the transporting accuracy measurement image printed by the printing apparatus for printing adjacent print images, based on a measurement value of each length in the transporting direction of transporting accuracy measurement image corresponding to the shared side, dimension correction is performed to the divided image data corresponding to each printing apparatus. Specifically, the divided image data corresponding to the printing apparatus for printing each print image is performed dimension correction, based on a measurement value of a second transporting accuracy measurement image of one print image and a first transporting accuracy measurement image of the other print image, the print image is printed at a position corresponding to the side shared by each the print image when joining the divided print image. For example, there is a difference in the amount of transport and the speed of transport on the two sides along the transporting direction of the printing medium, even when a difference occurs between the measurement value of the first transporting accuracy measurement image and the measurement value of the second transporting accuracy measurement image, in the correcting step, since the correction is performed based on the measurement value of the length of each transporting accuracy measurement image, the occurrence of shift of the joint in adjacent print images is suppressed.

The printing method described above may include a reference image selecting step for selecting reference image data as a reference of dimension correction from among the plurality of the divided image data divided, wherein in the measurement image printing step, as the transporting accuracy measurement image, printing a first transporting accuracy measurement image in a region along one side of sides along the transporting direction of the printing medium, and printing a second transporting accuracy measurement image in a region along another side of the sides along the transporting direction, when the printing apparatus assigned with the reference image data is defined as a reference printing apparatus, and a print image printed by the reference printing apparatus based on the reference image data is defined as a reference print image, and a print image adjacent to the reference print image in a direction intersecting the transporting direction is defined as a first adjacent print image, and the divided image data on which the first adjacent print image is based is defined as a first adjacent divided image data, and the printing apparatus assigned with the first adjacent divided image data is defined as a first adjacent printing apparatus, and a measurement value of a length in the transporting direction of the first transporting accuracy measurement image printed by the reference printing apparatus is defined as a third measurement value, and a measurement value of a length in the transporting direction of the second transporting accuracy measurement image printed by the reference printing apparatus is defined as a fourth measurement value, and a measurement value of a length in the transporting direction of the first transporting accuracy measurement image printed by the first adjacent printing apparatus is defined as a fifth measurement value, and a measurement value of a length in the transporting direction of the second transporting accuracy measurement image printed by the first adjacent printing apparatus is defined as a sixth measurement value, and when a side shared by the reference print image and the first adjacent print image is the one side of the reference print image and the other side of the first adjacent print image, in the correcting step, correcting the first adjacent divided image data to be (the third measurement value/the second measurement value) times in a direction along the transporting direction, and when a side shared by the reference print image and the first adjacent print image is the other side of the reference print image and the one side of the first adjacent print image, in the correcting step, correcting the first adjacent divided image data to be (the fourth measurement value/the fifth measurement value) times in a direction along the transporting direction.

According to this printing method, in the measuring image printing step, as the transporting accuracy measurement image, the first transport accuracy measurement image is printed in a region along one side of the sides along the transporting direction of the printing medium, and the second transporting accuracy measurement image is printed on other side, and in the transporting accuracy measurement image printed by the printing apparatus for printing the reference print image and the print image adjacent to the reference print image, based on a measurement value of each length in the transporting direction of transporting accuracy measurement image corresponding to the shared side, dimension correction is performed to the divided image data corresponding to each printing apparatus. Specifically, the divided image data Dn corresponding to the printing apparatus for printing each print image is performed dimension correction, based on a measurement value of a first transporting accuracy measurement image of one print image and a second transporting accuracy measurement image of the other print image, the print image is printed at a position corresponding to the side shared by each the print image of the reference print image and the first adjacent print image when joining the divided print image. Since the correction is performed with the magnification based on the ratio of the measurement values of the lengths of the respective transporting accuracy measurement images, the occurrence of the shift at the joint between the print images adjacent to the reference print image is suppressed.

In the printing method described above, when a print image adjacent to the first adjacent print image so as to sandwich the first adjacent print image with the reference print image in a direction intersecting the transporting direction is defined as a second adjacent print image, and the divided image data based on the second adjacent print image is defined as a second adjacent divided image data, and the printing apparatus assigned with the second adjacent divided image data is defined as a second adjacent printing apparatus, and a measurement value of a length in the transporting direction of the transporting accuracy measurement image printed by the second adjacent printing apparatus is defined as a seventh measurement value, in the correcting step, as a dimension correction based on the acquired printing dimension accuracy information, correcting the second adjacent divided image data to be (the first measurement value/the seventh measurement value) times in a direction along the transporting direction.

According to this method, in the correcting step, based on the first measurement value as the transporting accuracy information of the printing apparatus assigned with the reference image data, and the seventh measurement value as the transporting accuracy information of the printing apparatus that prints an adjacent printed image in the same direction with respect to a print image adjacent to a reference printed image printed based on the reference image data, dimension correction of the corresponding divided image data is performed. Specifically, the dimension of the adjacent print image with reference to the print image based on the reference image data can be corrected to be (the first measurement value/the second measurement value) times, and based on the print image based on the reference image data, the print image that is adjacent to the adjacent print image sandwiched therebetween can be corrected to be (first measurement value/seventh measurement value) times. As a result, the dimension of the print image that is continuously adjacent to a print image is corrected with reference to the print image based on the reference image data, and the occurrence of shift of the joint in adjacent print images is suppressed.

In the printing method described above, when a print image adjacent to the first adjacent print image so as to sandwich the first adjacent print image with the reference print image in a direction intersecting the transporting direction is defined as a second adjacent print image, and the divided image data based on the second adjacent print image is defined as a second adjacent divided image data, and the printing apparatus assigned with the second adjacent divided image data is defined as a second adjacent printing apparatus, and a measurement value of a length in the transporting direction of the first transporting accuracy measurement image printed by the second adjacent printing apparatus is defined as an eighth measurement value, and a measurement value of a length in the transporting direction of the second transporting accuracy measurement image printed by the second adjacent printing apparatus is defined as a ninth measurement value, and when a side shared by the first adjacent print image and the second adjacent print image is the one side of the first adjacent print image and the other side of the second adjacent print image, in the correcting step, correcting the second adjacent divided image data to be (the third measurement value/the sixth measurement value) *(the fifth measurement value/the ninth measurement value) times in a direction along the transporting direction, and when a side shared by the first adjacent print image and the second adjacent print image is the other side of the first adjacent print image and the one side of the second adjacent print image, in the correcting step, correcting the second adjacent divided image data to be (the fourth measurement value/the fifth measurement value)*(the sixth measurement value/the eighth measurement value) times in a direction along the transporting direction.

According to this method, in the correcting step, the dimension of the print image that is continuously adjacent to a print image is corrected with reference to the print image based on the reference image data, and the occurrence of shift of the joint in adjacent print images is suppressed. Further, in this correction, the divided image data corresponding to the printing apparatus for printing each print image is performed dimension correction, based on a measurement value of a first transporting accuracy measurement image of one print image and a second transporting accuracy measurement image of the other print image, the print image is printed at a position corresponding to the side shared by the print image for joining the divided print image. For example, there is a difference in the amount of transport and the speed of transport on the two sides along the transporting direction of the printing medium, even when a difference occurs between the measurement value of the first transporting accuracy measurement image and the measurement value of the second transporting accuracy measurement image, since the correction by the magnification based on the measurement value of the length of each transporting accuracy measurement image is performed, the occurrence of deviation of the joint in adjacent print images is suppressed.

In the printing method described above, when k, m is an integer greater than or equal to 2, and a column direction is the transporting direction, a row direction is a direction intersecting the transporting direction, in the image dividing step, dividing the original image data into the divided image data having k rows and m columns, and in the reference image selecting step, the reference image data is configured to be selected for each of the divided image data in each of the divided rows.

According to this method, even when the original image data is divided into a plurality of divided image data in a matrix, since the reference image data as a reference for the dimension correction for each image data in each row over a plurality of rows can be selected, with reference to the reference image data set in each row over a plurality of rows, the occurrence of deviation of the joint in adjacent print images is suppressed.

In the printing method described above, in the measurement image printing step, as the transporting accuracy measurement image, printing a first transporting accuracy measurement image in a region along one side of sides along the transporting direction of the printing medium, and printing a second transporting accuracy measurement image in a region along another side of the sides along the transporting direction, when one of the print images printed based on the divided image data and adjacent to each other in a direction intersecting the transporting direction is defined as a first print image, and the other of the print images is defined as a second print image, and the divided image data on which the first print image is based is defined as a first divided image data, the divided image data on which the second print image is based is defined as a second divided image data, and the printing apparatus assigned with the first divided image data is defined as a first printing apparatus, the printing apparatus assigned with the second divided image data is defined as a second printing apparatus, and a measurement value of a length in the transporting direction of the first transporting accuracy measurement image printed by the first adjacent printing apparatus is defined as a tenth measurement value, and a measurement value of a length in the transporting direction of the second transporting accuracy measurement image printed by the first adjacent printing apparatus is defined as an eleventh measurement value, and a measurement value of a length in the transporting direction of the first transporting accuracy measurement image printed by the second adjacent printing apparatus is defined as a twelfth measurement value, and a measurement value of a length in the transporting direction of the second transporting accuracy measurement image printed by the second adjacent printing apparatus is defined as a thirteenth measurement value, and when a side shared by the first print image and the second print image is the one side of the first print image and the other side of the second adjacent print image, in the correcting step, correcting the second divided image data so that: in a direction along the transporting direction, correcting a length of the one side of the second divided image data to be (the tenth measurement value/the twelfth measurement value) times, and correcting a length of the other side to be (the tenth measurement value/the thirteenth measurement value) times, and correcting a length in a range from the one side to the other side to be a multiple times that the multiple is obtained by proportionally distributing the multiple for correcting the length of the one side and the multiple for correcting the length of the other side, and when a side shared by the first print image and the second print image is the other side of the first print image and the one side of the second adjacent print image, in the correcting step, correcting the second divided image data so that: in a direction along the transporting direction, correcting a length of the one side of the second divided image data to be (the eleventh measurement value/the twelfth measurement value) times, and correcting a length of the other side to be (the eleventh measurement value/the thirteenth measurement value) times, and correcting a length in a range from the one side to the other side to be a multiple times that the multiple is obtained by proportionally distributing the multiple for correcting the length of the one side and the multiple for correcting the length of the other side.

According to this method, the length of the second print image in the transport direction can be corrected to match the length of the side shared with the adjacent first print image. In addition, in the second printed image to be printed in the second printing apparatus, when the length of one side and the other side is different, specifically, even when the transporting speed is inclined in the direction intersecting the transporting direction, that is, in the width direction of the printing medium, the length of the range from one side to the other side is multiplied by a factor that is multiplied by a multiple that corrects the length of one side and a multiple that corrects the length of the other side, thus, the length of the second print image in the width direction can be adjusted to the length of the side that shares the length in the conveyance direction with the adjacent first print image. As a result, even when the original image data is divided into a plurality of pieces of divided image data in a matrix form, the print images can be connected without any gap or shift.

The printing method described above may include a reference image selecting step for selecting reference image data as a reference of dimension correction from among the plurality of the divided image data divided, wherein when the printing apparatus assigned with the reference image data is defined as a reference printing apparatus, and a print image printed by the reference printing apparatus based on the reference image data is defined as a reference print image, and a print image adjacent to the reference print image in a direction intersecting the transporting direction is defined as a first adjacent print image, and the divided image data on which the first adjacent print image is based is defined as a first adjacent divided image data, and the printing apparatus assigned with the first adjacent divided image data is defined as a first adjacent printing apparatus, in the assigning step, assigning the printing apparatuses, which is a combination having the smallest correction amount of dimension of the first adjacent divided image data based on the printing dimension accuracy information of each of the printing apparatuses, to the reference printing apparatus and the first adjacent printing apparatus.

According to this method, the correction amount of the adjacent print image with respect to the reference print image is reduced, so the large printed matter that is closer to the original image can be obtained in the peripheral print image including the reference print image, and the convenience is increased for the user.

The printing method described above may include a reference image selecting step for selecting reference image data as a reference of dimension correction from among the plurality of the divided image data divided, wherein in the measurement image printing step, as the transporting accuracy measurement image, printing a first transporting accuracy measurement image in a region along one side of sides along the transporting direction of the printing medium, and printing a second transporting accuracy measurement image in a region along another side of the sides along the transporting direction, when the printing apparatus assigned with the reference image data is defined as a reference printing apparatus, and a print image printed by the reference printing apparatus based on the reference image data is defined as a reference print image, and a print image adjacent to the reference print image in a direction intersecting the transporting direction is defined as a first adjacent print image, and the divided image data on which the first adjacent print image is based is defined as a first adjacent divided image data, and the printing apparatus assigned with the first adjacent divided image data is defined as a first adjacent printing apparatus, and a measurement value of a length in the transporting direction of the first transporting accuracy measurement image printed by the reference printing apparatus is defined as a third measurement value, and a measurement value of a length in the transporting direction of the first transporting accuracy measurement image printed by the first adjacent printing apparatus is defined as a fifth measurement value, and a measurement value of a length in the transporting direction of the second transporting accuracy measurement image printed by the first adjacent printing apparatus is defined as a sixth measurement value, and when (the third measurement value−the sixth measurement value)$^2$>(the third measurement value−the fifth measurement value)$^2$, in the correcting step, converting the first adjacent divided image data so that the first adjacent print image rotates with respect to the transporting direction, and correcting the first adjacent divided image data to be (the third measurement value/the fifth measurement value) times in a direction along the transporting direction.

According to this method, the correction amount of the adjacent print image with respect to the reference print image is reduced, so the large printed matter that is closer to the original image can be obtained in the peripheral print image including the reference print image, and the convenience is increased for the user.

In the printing method described above, the transporting accuracy measurement image may include a start point image indicating a start point of the transporting accuracy measurement image in the transporting direction, and an end point image indicating an end point of the transporting accuracy measurement image in the transporting direction.

According to this method, since no image is formed between the start point image and the end point image, the printing medium can be effectively used.

A printing system according to the present disclosure includes a plurality of printing apparatuses, and a controlling apparatus configured to control the plurality of the printing apparatuses to perform poster printing by distributed printing, wherein the controlling apparatus includes a storage unit that stores print dimension accuracy information of each of the plurality of the printing apparatuses, and a printing apparatus control unit configured to divide original image data to be printed into a plurality of divided image data, and assign each of the divided image data divided to two or more printing apparatuses of the plurality of the printing apparatuses, and perform dimension correction on a part or all of the divided image data corresponding to each of the printing apparatuses based on the print dimension accuracy information of each of the printing apparatuses assigned with the divided image data, and cause the printing apparatus assigned with the divided image data to execute printing based on the divided image data with the part or all of the divided image data subjected to the dimension correction.

According to this configuration, the controlling apparatus performs dimension correction on a part or all of the divided image data corresponding to each of the printing apparatuses based on the printing dimension accuracy information of each of the printing apparatuses to which a plurality of divided image data obtained by dividing the original image data are assigned. Thus, by joining the plurality of printed matters printed, for example, in poster printing for completing a large printed matter such as an oversized poster, variation in the dimension of the print image caused by individual differences of the plurality of printing apparatuses is corrected. As a result, in poster printing, the occurrence of image shift in the print image of the joint is suppressed.

A printing system according to the present disclosure includes a plurality of printing apparatuses, and a controlling apparatus included in any one of the plurality of the printing apparatuses and configured to control the plurality of the printing apparatuses to perform poster printing by distributed printing, wherein the controlling apparatus includes a storage unit that stores print dimension accuracy information of each of the plurality of the printing apparatuses and a printing apparatus control unit configured to divide original image data to be printed into a plurality of divided image data, and assign each of the divided image data divided to two or more printing apparatuses of the plurality of the printing apparatuses, and perform dimension correction on a part or all of the divided image data corresponding to each of the printing apparatuses based on the print dimension accuracy information of each of the printing apparatuses assigned with the divided image data, and cause the printing apparatus assigned with the divided image data to execute printing based on the divided image data with the part or all of the divided image data subjected to the dimension correction.

Even with this configuration, similar advantages as described above can be obtained.

A printing system according to the present disclosure includes a plurality of printing apparatuses and a controlling apparatus configured to control the plurality of the printing apparatuses to perform poster printing by distributed printing, wherein each printing apparatus of the plurality of the printing apparatuses includes a storage unit that stores print dimension accuracy information of the printing apparatus its own, the controlling apparatus includes a printing apparatus control unit configured to divide original image data to be printed into a plurality of divided image data, and assign each of the divided image data divided to two or more printing apparatuses of the plurality of the printing apparatuses, and acquire the print dimension accuracy information from each of the printing apparatuses assigned with the divided image data, and perform dimension correction on a part or all of the divided image data corresponding to each of the printing apparatuses based on the print dimension accuracy information acquired, and cause the printing apparatus assigned with the divided image data to execute printing based on the divided image data with the part or all of the divided image data subjected to the dimension correction.

Even with this configuration, similar advantages as described above can be obtained.

A printing system according to the present disclosure includes a plurality of printing apparatuses, and a controlling apparatus configured to control the plurality of the printing apparatuses to perform poster printing by distributed printing, wherein the controlling apparatus includes a printing apparatus control unit configured to divide original image data to be printed into a plurality of divided image data, and assign each of the divided image data divided to two or more printing apparatuses of the plurality of the printing apparatuses, each printing apparatus of the plurality of the printing apparatuses includes, a storage unit configured to store print dimension accuracy information of the printing apparatus its own, a printing unit configured to perform printing on a printing medium, and a printing control unit configured to perform dimension correction on the divided image data that is assigned, based on the print dimension accuracy information, and execute printing on the printing apparatus based on the divided image data that was performed the dimension correction.

Even with this configuration, similar advantages as described above can be obtained.

A printing system according to the present disclosure includes a plurality of printing apparatuses and a controlling apparatus included in any one of the plurality of the printing apparatuses and configured to control the plurality of the printing apparatuses to perform poster printing by distributed printing, wherein each printing apparatus of the plurality of the printing apparatuses includes a storage unit that stores its own print dimension accuracy information, the controlling apparatus includes a printing apparatus control unit configured to divide original image data to be printed into a plurality of divided image data, and assign each of the divided image data divided to two or more printing apparatuses of the plurality of the printing apparatuses, and acquire the print dimension accuracy information from each of the printing apparatuses assigned with the divided image data, and perform dimension correction on a part or all of the divided image data corresponding to each of the printing apparatuses based on the print dimension accuracy information acquired, and cause the printing apparatus assigned with the divided image data to execute printing based on the divided image data with the part or all of the divided image data subjected to the dimension correction.

Even with this configuration, similar advantages as described above can be obtained.

A printing apparatus according to the present disclosure constitutes a printing system for performing poster printing by distributed printing, the printing apparatus includes a storage unit configured to store print dimension accuracy information of the printing apparatus its own, a printing unit configured to perform printing on a printing medium.

According to this configuration, since the printing apparatus includes a storage unit that stores the printing dimension accuracy information of the printing apparatus its own, for example, the dimension correction can be performed to the divided image data assigned in the printing system based on the printing dimension accuracy information. As a result, in poster printing, the occurrence of image shift in the print image of the joint is suppressed.

A printing apparatus according to the present disclosure may include a printing control unit configured to control the printing unit, and a transporting unit configured to transport the printing medium, wherein the printing dimension accuracy information includes transporting accuracy information when the transporting unit transports the printing medium in a transporting direction, and the printing control unit is configured to correct the transporting amount of the printing medium transported by the transporting unit based on the transporting accuracy information.

According to this configuration, the printing apparatus includes a storage unit that stores the printing dimension accuracy information of the printing apparatus, wherein when printing is executed based on the divided image data assigned in the printing system, the dimension of the print image can be corrected by correcting the transporting amount for transporting the print medium based on the print dimension accuracy information. As a result, in poster printing, the occurrence of image shift in the print image of the joint is suppressed. In addition, in the poster printing, when the correction of the print data is performed, by the printing control unit included in the printing apparatus, based on the print dimension accuracy information of the printing apparatus its own, it is possible to perform the printing in which the image shift is suppressed from occurring in the print image at the joint without providing a new function to the printing system.

A program according to the present application is a program controlling poster printing by distributed printing in a printing system including a plurality of printing apparatuses, the programs comprising an image dividing function for dividing original image data to be printed into a plurality of divided image data, an assigning function for assigning each of the divided image data to two or more printing apparatuses among the plurality of the printing apparatuses, an accuracy information acquiring function for acquiring print dimension accuracy information of each of the printing apparatuses assigned with the divided image data, and a correcting function for performing dimension correction on a part or all of the divided image data corresponding to each of the printing apparatuses based on the acquired print dimension accuracy information.

The program includes a correcting function for performing dimension correction on a part or all of the divided image data corresponding to each of the printing apparatuses based on the printing dimension accuracy information of each of the printing apparatuses to which a plurality of divided image data obtained by dividing the original image data are assigned Thus, by joining the plurality of printed matters printed, for example, in poster printing for completing a large printed matter such as an oversized poster, variation in the dimension of the print image caused by individual differences of the plurality of printing apparatuses is corrected. As a result, in poster printing, the occurrence of image shift in the print image of the joint is suppressed.

What is claimed is:

1. A printing method for performing poster printing in a printing system comprising a plurality of printing apparatuses, the printing method comprising:
    an image dividing step for dividing original image data to be printed into a plurality of divided image data;
    an assigning step for assigning each of the divided image data to two or more printing apparatuses among the plurality of the printing apparatuses;
    an accuracy information acquiring step for acquiring print dimension accuracy information of each of the printing apparatuses assigned with the divided image data;
    a correcting step for performing dimension correction on a part or all of the divided image data corresponding to the printing apparatus assigned with each of the divided image data based on the acquired print dimension accuracy information; and
    a printing step for performing printing by the printing apparatus assigned with the divided image data based on the divided image data that underwent the correcting step.

2. The printing method according to claim 1, wherein the printing dimension accuracy information includes transporting accuracy information of a printing medium transported in a transporting direction of the printing apparatus.

3. The printing method according to claim 2, further comprising:
a measurement image printing step for printing a transporting accuracy measurement image on the printing medium by each of the plurality of the printing apparatuses;
and a transporting accuracy measuring step for measuring a length in the transporting direction of the printed transporting accuracy measurement image, and deriving the transporting accuracy information based on the measured length.

4. The printing method according to claim 3, further comprising:
a reference image selecting step for selecting reference image data as a reference of dimension correction from among the plurality of the divided image data divided, wherein
when the printing apparatus assigned with the reference image data is defined as a reference printing apparatus,
a print image printed by the reference printing apparatus based on the reference image data is defined as a reference print image,
a print image adjacent to the reference print image in a direction intersecting the transporting direction is defined as a first adjacent print image,
the divided image data on which the first adjacent print image is based is defined as a first adjacent divided image data,
the printing apparatus assigned with the first adjacent divided image data is defined as a first adjacent printing apparatus,
a measurement value of a length in the transporting direction of the transporting accuracy measurement image printed by the reference printing apparatus is defined as a first measurement value,
and a measurement value of a length in the transporting direction of the transporting accuracy measurement image printed by the first adjacent printing apparatus is defined as a second measurement value,
the correcting step includes, as a dimension correction based on the acquired printing dimension accuracy information, correcting the first adjacent divided image data to be (the first measurement value/the second measurement value) times in a direction along the transporting direction.

5. The printing method according to claim 3, wherein
the measurement image printing step includes, as the transporting accuracy measurement image, printing a first transporting accuracy measurement image in a region along one side of sides along the transporting direction of the printing medium, and printing a second transporting accuracy measurement image in a region along another side of the sides along the transporting direction,
when one of the print images printed based on the divided image data and adjacent to each other in a direction intersecting the transporting direction is defined as a first print image, and the other of the print images is defined as a second print image,
the divided image data on which the first print image is based is defined as a first divided image data, the divided image data on which the second print image is based is defined as a second divided image data,
and the printing apparatus assigned with the first divided image data is defined as a first printing apparatus, the printing apparatus assigned with the second divided image data is defined as a second printing apparatus,
and when a side shared by the first print image and the second print image is the other side of the first print image and the one side of the second print image,
the correcting step includes correcting, based on a measurement value of a length in the transporting direction of the second transporting accuracy measurement image printed by the first printing apparatus and a measurement value of a length in the transporting direction of the first transporting accuracy measurement image printed by the second printing apparatus, a length, in a direction along the transporting direction, of at least one of the first divided image data and the second divided image data.

6. The printing method according to claim 3, further comprising:
a reference image selecting step for selecting reference image data as a reference of dimension correction from among the plurality of the divided image data divided, wherein
the measurement image printing step includes printing, as the transporting accuracy measurement image, a first transporting accuracy measurement image in a region along one side of sides, along the transporting direction, of the printing medium, and printing a second transporting accuracy measurement image in a region along the other side of the sides along the transporting direction,
when the printing apparatus assigned with the reference image data is defined as a reference printing apparatus,
a print image printed by the reference printing apparatus based on the reference image data is defined as a reference print image,
a print image adjacent to the reference print image in a direction intersecting the transporting direction is defined as a first adjacent print image,
the divided image data on which the first adjacent print image is based is defined as a first adjacent divided image data,
the printing apparatus assigned with the first adjacent divided image data is defined as a first adjacent printing apparatus,
a measurement value of a length in the transporting direction of the first transporting accuracy measurement image printed by the reference printing apparatus is defined as a third measurement value,
a measurement value of a length in the transporting direction of the second transporting accuracy measurement image printed by the reference printing apparatus is defined as a fourth measurement value,
a measurement value of a length in the transporting direction of the first transporting accuracy measurement image printed by the first adjacent printing apparatus is defined as a fifth measurement value,
and a measurement value of a length in the transporting direction of the second transporting accuracy measurement image printed by the first adjacent printing apparatus is defined as a sixth measurement value,
and when a side shared by the reference print image and the first adjacent print image is the one side of the reference print image and the other side of the first adjacent print image, the correcting step includes correcting the first adjacent divided image data to be (the third measurement value/the sixth measurement value) times in a direction along the transporting direction, and when a side shared by the reference print image and the first adjacent print image is the other side of the reference print image and the one side of the first adjacent print image, the correcting step includes correcting the first adjacent divided image data to be (the fourth measurement value/the fifth measurement value) times in a direction along the transporting direction.

7. The printing method according to claim 4, wherein when a print image adjacent to the first adjacent print image so as to sandwich the first adjacent print image with the reference print image in a direction intersecting the transporting direction is defined as a second adjacent print image, the divided image data based on the second adjacent print image is defined as a second adjacent divided image data, the printing apparatus assigned with the second adjacent divided image data is defined as a second adjacent printing apparatus, a measurement value of a length in the transporting direction of the transporting accuracy measurement image printed by the second adjacent printing apparatus is defined as a seventh measurement value, the correcting step includes correcting, as a dimension correction based on the acquired printing dimension accuracy information, the second adjacent divided image data to be (the first measurement value/the seventh measurement value) times in a direction along the transporting direction.

8. The printing method according to claim 6, wherein when a print image adjacent to the first adjacent print image so as to sandwich the first adjacent print image with the reference print image in a direction intersecting the transporting direction is defined as a second adjacent print image, the divided image data based on the second adjacent print image is defined as a second adjacent divided image data, the printing apparatus assigned with the second adjacent divided image data is defined as a second adjacent printing apparatus, a measurement value of a length in the transporting direction of the first transporting accuracy measurement image printed by the second adjacent printing apparatus is defined as an eighth measurement value, and a measurement value of a length in the transporting direction of the second transporting accuracy measurement image printed by the second adjacent printing apparatus is defined as a ninth measurement value, and when a side shared by the first adjacent print image and the second adjacent print image is the one side of the first adjacent print image and the other side of the second adjacent print image, the correcting step includes correcting the second adjacent divided image data to be (the third measurement value/the sixth measurement value)*(the fifth measurement value/the ninth measurement value) times in a direction along the transporting direction, and when a side shared by the first adjacent print image and the second adjacent print image is the other side of the first adjacent print image and the one side of the second adjacent print image, the correcting step includes correcting the second adjacent divided image data to be (the fourth measurement value/the fifth measurement value)*(the sixth measurement value/the eighth measurement value) times in a direction along the transporting direction.

9. The printing method according to claim 4, wherein

When k, m is an integer greater than or equal to 2, a column direction is the transporting direction, and a row direction is a direction intersecting the transporting direction, the image dividing step includes dividing the original image data into the divided image data having k rows and m columns, and in the reference image selecting step, the reference image data is selectable for each of the divided image data in each of the divided rows.

10. The printing method according to claim 3, wherein the measurement image printing step includes, as the transporting accuracy measurement image, printing a first transporting accuracy measurement image in a region along one side of sides, along the transporting direction, of the printing medium, and printing a second transporting accuracy measurement image in a region along another side of the sides along the transporting direction, when one of print images printed based on the divided image data and adjacent to each other in a direction intersecting the transporting direction is defined as a first print image, and the other of the print images is defined as a second print image, the divided image data on which the first print image is based is defined as a first divided image data, the divided image data on which the second print image is based is defined as a second divided image data, the printing apparatus assigned with the first divided image data is defined as a first printing apparatus, the printing apparatus assigned with the second divided image data is defined as a second printing apparatus, a measurement value of a length in the transporting direction of the first transporting accuracy measurement image printed by the first printing apparatus is defined as a tenth measurement value, a measurement value of a length in the transporting direction of the second transporting accuracy measurement image printed by the first printing apparatus is defined as an eleventh measurement value, a measurement value of a length in the transporting direction of the first transporting accuracy measurement image printed by the second printing apparatus is defined as a twelfth measurement value, and a measurement value of a length in the transporting direction of the second transporting accuracy measurement image printed by the second printing apparatus is defined as a thirteenth measurement value, and when a side shared by the first print image and the second print image is the one side of the first print image and the other side of the second print image, the correcting step includes correcting the second divided image data by correcting, in a direction along the transporting direction, a length of the one side of the second divided image data to be (the tenth measurement value/the twelfth measurement value) times, and correcting a length of the other side to be (the tenth measurement value/the thirteenth measurement value) times, and correcting a length in a range from the one side to the other side by multiplying the length by a multiple obtained by proportionally distributing the multiple for correcting the length of the one side and the multiple for correcting the length of the other side, and when a side shared by the first print image and the second print image is the other side of the first print image and the one side of the second print image, the correcting step includes correcting the second divided image data by correcting, in a direction along the transporting direction, a length of the one side of the second divided image data to be (the eleventh measurement value/the twelfth measurement value) times, and correcting a length of the other side to be (the eleventh measurement value/the thirteenth measurement value) times, and correcting a length in a range from the one side to the other side by multiplying the length by a multiple obtained by proportionally distributing the multiple for correcting the length of the one side and the multiple for correcting the length of the other side.

11. The printing method according to claim 3, further comprising:

a reference image selecting step for selecting reference image data as a reference of dimension correction from among the plurality of the divided image data divided, wherein when the printing apparatus assigned with the reference image data is defined as a reference printing apparatus, a print image printed by the reference printing apparatus based on the reference image data is defined as a reference print image, a print image adjacent to the reference print image in a direction intersecting the transporting direction is defined as a first adjacent print image, the divided image data on which the first adjacent print image is based is defined as a first adjacent divided image data, and the printing apparatus assigned with the first adjacent divided image data is defined as a first adjacent printing apparatus, the assigning step includes assigning, based on the printing dimension accuracy information of each of the printing apparatuses, the printing apparatuses, which are a combination having the smallest correction amount of dimension of the first adjacent divided image data, to the reference printing apparatus and the first adjacent printing apparatus.

12. The printing method according to claim 3, further comprising:

a reference image selecting step for selecting reference image data as a reference of dimension correction from among the plurality of the divided image data divided, wherein the measurement image printing step includes, as the transporting accuracy measurement image, printing a first transporting accuracy measurement image in a region along one side of sides, along the transporting direction, of the printing medium, and printing a second transporting accuracy measurement image in a region along another side of the sides along the transporting direction, when the printing apparatus assigned with the reference image data is defined as a reference printing apparatus, a print image printed by the reference printing apparatus based on the reference image data is defined as a reference print image, a print image adjacent to the reference print image in a direction intersecting the transporting direction is defined as a first adjacent print image, the divided image data on which the first adjacent print image is based is defined as a first adjacent divided image data, the printing apparatus assigned with the first adjacent divided image data is defined as a first adjacent printing apparatus, a measurement value of a length in the transporting direction of the first transporting accuracy measurement image printed by the reference printing apparatus is defined as a third measurement value, a measurement value of a length in the transporting direction of the first transporting accuracy measurement image printed by the first adjacent printing apparatus is defined as a fifth measurement value, and a measurement value of a length in the transporting direction of the second transporting accuracy measurement image printed by the first adjacent printing apparatus is defined as a sixth measurement value, and when (the third measurement value−the sixth measurement value)$^2$>(the third measurement value−the fifth measurement value)$^2$, the correcting step includes converting the first adjacent divided image data so that the first adjacent print image rotates with respect to the transporting direction, and correcting the first adjacent divided image data to be (the third measurement value/the fifth measurement value) times in a direction along the transporting direction.

13. The printing method according to claim 3, wherein the transporting accuracy measurement image includes a start point image indicating a start point of the transporting accuracy measurement image in the transporting direction, and an end point image indicating an end point of the transporting accuracy measurement image in the transporting direction.

14. A printing system, comprising:

a plurality of printing apparatuses; and a controlling apparatus configured to control the plurality of the printing apparatuses to perform poster printing by distributed printing, wherein the controlling apparatus includes:

a storage unit that stores print dimension accuracy information of each of the plurality of the printing apparatuses; and a printing apparatus control unit configured to divide original image data to be printed into a plurality of divided image data, and assign each of the divided image data divided to two or more printing apparatuses of the plurality of the printing apparatuses, and perform dimension correction on a part or all of the divided image data corresponding to each of the printing apparatuses based on the print dimension accuracy information of each of the printing apparatuses assigned with the divided image data, and cause the printing apparatus assigned with the divided image data to execute printing based on the divided image data with the part or all of the divided image data subjected to the dimension correction.

15. A printing system, comprising:

a plurality of printing apparatuses; and a controlling apparatus included in any one of the plurality of the printing apparatuses and configured to control the plurality of the printing apparatuses to perform poster printing by distributed printing, wherein the controlling apparatus includes:

a storage unit that stores print dimension accuracy information of each of the plurality of the printing apparatuses; and a printing apparatus control unit configured to divide original image data to be printed into a plurality of divided image data, assign each of the divided image data divided to two or more printing apparatuses of the plurality of the printing apparatuses, perform dimension correction on a part or all of the divided image data corresponding to each of the printing apparatuses based on the print dimension accuracy information of each of the printing apparatuses assigned with the divided image data, and cause the printing apparatus assigned with the divided image data to execute printing based on the divided image data with the part or all of the divided image data subjected to the dimension correction.

* * * * *